(12) United States Patent
Pu et al.

(10) Patent No.: US 6,972,121 B2
(45) Date of Patent: Dec. 6, 2005

(54) ADVANCED CONTROL STRATEGIES FOR CHLORINE DIOXIDE GENERATING PROCESSES

(75) Inventors: Chunmin Pu, Mississauga (CA); John Brian Birks, Toronto (CA); James Johannes Hopmans, Maple (CA)

(73) Assignee: Superior Plus Inc., Alberta (CA)

( * ) Notice: Subject to any disclaimer, the term of this patent is extended or adjusted under 35 U.S.C. 154(b) by 185 days.

(21) Appl. No.: 10/204,017

(22) PCT Filed: Mar. 14, 2001

(86) PCT No.: PCT/CA01/00332

§ 371 (c)(1),
(2), (4) Date: Oct. 29, 2002

(87) PCT Pub. No.: WO01/68518

PCT Pub. Date: Sep. 20, 2001

(65) Prior Publication Data

US 2003/0118503 A1 Jun. 26, 2003

(51) Int. Cl.⁷ .............................................. C01B 11/02
(52) U.S. Cl. ........................ 423/478; 700/24; 700/266; 436/124
(58) Field of Search .......................... 423/478; 700/266, 700/24; 422/105; 436/124

(56) References Cited

U.S. PATENT DOCUMENTS

| | | | |
|---|---|---|---|
| 3,852,033 A | | 12/1974 | Hultman |
| 3,864,456 A | * | 2/1975 | Winfield et al. ............ 423/478 |
| 4,081,520 A | * | 3/1978 | Swindells et al. .......... 423/478 |
| 4,251,224 A | | 2/1981 | Cowley |
| 4,251,503 A | | 2/1981 | Swindells |
| 4,770,868 A | * | 9/1988 | Norell ........................ 423/479 |
| 4,839,152 A | * | 6/1989 | Vella et al. ................. 423/478 |
| 5,091,167 A | * | 2/1992 | Engstrom et al. ........... 423/478 |
| 5,382,520 A | * | 1/1995 | Jenson et al. ................. 436/55 |
| 2003/0229422 A1 | * | 12/2003 | Martens et al. ............. 700/266 |

OTHER PUBLICATIONS

Database WPI Section Ch Week 1999931 Derwent Publication Ltd London GB AN 1994–066251 XP002176549 & CA 2092238 CA Sterling Canada Inc 1999 Abstract.

* cited by examiner

Primary Examiner—Ngoc-Yen Nguyen
(74) Attorney, Agent, or Firm—Sim & McBurney

(57) ABSTRACT

Chlorine dioxide generating processes of the single vessel type which produce chlorine dioxide of high purity are monitored and controlled by a computer using Advanced Control Strategies for steady, stable operation with optimum chemical usage on the basis of a desired chlorine dioxide production rate as the sole input from an operator to the computer program effecting the computer control.

32 Claims, 20 Drawing Sheets

SC9: REBOILER STEAM FLOW SET POINT DETERMINATION (PART 1 OF 2)

ADVANCED CONTROL STRATEGIES FOR CHLORINE DIOXIDE GENERATING PROCESSES

FIELD OF THE INVENTION

The present invention relates to the generation of chlorine dioxide, particularly for pulp bleaching and, specifically, the control of such process.

BACKGROUND TO THE INVENTION

Chlorine dioxide is produced commercially on site at a pulp mill for use as a bleaching agent for the pulp. A variety of procedures have been described in the prior art and have been used commercially. In general, the process proceeds in accordance with the equation:

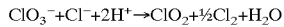

$$ClO_3^- + Cl^- + 2H^+ \rightarrow ClO_2 + \tfrac{1}{2}Cl_2 + H_2O$$

One common procedure involves the so-called single vessel process (SVP), in which chlorine dioxide is formed from an aqueous acid reaction medium, or generator liquor, which is maintained at its boiling point in a reaction zone under a subatmospheric pressure. Chlorine dioxide is removed from the generator in gaseous admixture with water vapour and is absorbed into chilled water in an absorption tower while by-product salt from the process precipitates in the generator and is removed therefrom. Make-up chlorate and acid are continuously added to maintain steady state conditions in the generator liquor. A steam-fed reboiler in a recycle loop is used to maintain the generator liquor at its boiling point.

In this procedure, the chloride ion may be produced in situ by using reducing agents which are believed to react with the chlorine co-produced in the process, such as methanol and hydrogen peroxide, in which case the chlorine dioxide is obtained substantially free from chlorine. Alternatively, the chloride ion may be added as the reducing agent, in which case the chlorine dioxide is obtained in admixture with a significant proportion of chlorine.

Two key control variables in the production of chlorine dioxide are the acid normality and chlorate molarity in the generator liquor. Unfortunately, a viable on-line instrument to measure these key control variables is not commercially available and hence presently, an operator must rely upon the results of manual laboratory tests, performed usually at two hours intervals, to guide him in making adjustments to the manipulated variables (i.e. acid and chlorate feed rates) to maintain chlorine dioxide production at the desired level. The control is further complicated by fluctuations in generator liquor level that result in the generator liquor species either concentrating or diluting in the intervals between laboratory tests and thus it is difficult to control these variables using conventional control strategies.

Modern control systems found in most chlorine dioxide plants are equipped with microprocessors capable of rapidly computing complex, multivariable algorithms. This advancement in computing technology has provided the opportunity for the optimization of chemical processes through the implementation of advanced control strategies. It has long been desired to provide a series of advanced control strategies intended to closely supervise the operation of the chlorine dioxide plant with the sole input being the target chlorine dioxide production rate. This concept is realized by the present invention as described in detail below. The entire plant operation can be manipulated by the advanced control strategies, which may be implemented by a microprocessor. Laboratory tests are initially required to establish plant specific chemical consumption ratios, but once such initial testing is completed, the frequency of laboratory tests can be substantially reduced.

Previous methods for controlling chlorine dioxide processes are set forth in the following U.S. patents:

| U.S. Pat. No. | Patentee |
|---|---|
| 4,251,503 | Cowley et al. |
| 4,251,224 | Swindells et al. |

Both cited patents, assigned to the assignee hereof, relate to the machine control of chlorine dioxide generating processes, using chloride ions as the reducing agent, producing a gaseous mixture of chlorine and chlorine dioxide. Both patents disclose a method of adjusting operating parameters as a function of efficiency determined from gas analysis (i.e. comparing the ratio of chlorine dioxide to chlorine). The present invention, however, addresses the advanced control strategies with novel concepts to control modern, environmentally-friendly processes generating chlorine dioxide of high purity (e.g. using methanol as the reducing agents, such as R8®, SVP-MeOH® and SVP-Lite®) with only trace amounts of chlorine present in the product. The control strategies of the prior art and the invention, therefore, relate to the chlorine dioxide processes using different chemistry.

SUMMARY OF THE INVENTION

As indicated above, the present invention is concerned with advanced control strategies for controlling chlorine dioxide generating processes of the single vessel type which produce chlorine dioxide of high purity and the implementation of such control strategies using a suitably programmed microprocessor. The control strategies provided herein steer all key process variables on a dynamic basis and adjustments are made instantly.

The goals of this invention are listed below:
Target chlorine dioxide production rate achieved and maintained,
Steady, stable operation under optimum operating conditions,
Operation monitored and controlled by a computer,
Operator involvement and frequency of manual laboratory testing decreased,
Plant performance optimized and chemical savings realized.

In one aspect of the present invention, there is provided a continuous process for the generation of chlorine dioxide at a predetermined production rate, which comprises reducing chlorate ions, generally provided by sodium chlorate, chloric acid or mixtures in an aqueous acid reaction medium in a reaction zone using a reducing agent and sulfuric acid at the boiling point of the reaction medium under a subatmospheric pressure; removing a gaseous admixture comprising water vapour and chlorine dioxide from the reaction medium; absorbing said gaseous admixture in chilled water in an absorption zone to provide a product aqueous solution of chlorine dioxide; removing a slurry of spent reaction medium and by-product crystalline sodium sulfate from the reaction zone; separating the crystalline sodium sulfate as a by-product from spent reaction medium; adding make-up quantities of sodium chlorate, reducing agent and sulfuric acid to the spent reaction medium to form a make-up feed;

evaporating water inputted to the process from all sources using steam fed to a reboiler; recycling the make-up feed to the reaction zone; and computer controlling said process on the basis of a desired chlorine dioxide production rate as the sole input from an operator to a computer program effecting such computer control.

The computer control operation may comprise continuously monitoring the target production rate of aqueous chlorine dioxide solution for changes therein, continuously monitoring the flow rates of sodium chlorate, reducing agent, sulfuric acid, reboiler steam and chilled water to the process, and modifying the initial set points of all said flows in accordance with the changed target production rate.

The computer control operation also may comprise continuously monitoring the production rate of aqueous chlorine dioxide solution for deviations from the target production rate, and modifying the reducing agent flow rate to maintain the production rate at its target.

In one feature of the invention, the maximum allowable chlorine dioxide product solution strength and maximum allowable temperature are determined and advised to an operator.

The computer control operation may further comprise continuously monitoring the specification of all material feeds, and modifying the appropriate flow rate set points of the feeds to the reaction zone based on the target production rate and in response to changes in material specification.

The computer control operation may additionally comprise continuously monitoring sodium chlorate solution physical properties, temperature and density, and, on this basis, creating an on-line virtual chlorate solution analyzer that determines the volumetric concentration of the sodium chlorate solution.

The on-line virtual chlorate solution analyzer provides an accuracy of about ±0.3% in the sodium chlorate concentration range of about 450 to about 750 gpL.

The computer control operation may further comprise continuously monitoring the mass input of sodium chlorate to the reaction medium, continuously monitoring the mass consumption of sodium chlorate by the process, and modifying the flow of sodium chlorate to the reaction medium to correspond to the mass consumption of sodium chlorate so as to maintain the sodium chlorate concentration in the reaction medium substantially constant.

The computer control operation may further comprise establishing the boiling temperature set point of the reaction medium based on the expected reaction medium composition, continuously monitoring the temperature of the aqueous acid reaction medium, continuously controlling the temperature of the reaction medium in order to maintain a constant acid normality in the reaction medium, and continuously determining the acid normality of the aqueous acid reaction medium from the temperature of the aqueous solution.

In the latter procedure, the computer control operation may further comprise continuously determining whether the temperature of the aqueous reaction medium differs from the temperature set point, and correcting such deviation by suitable modification to the acid flow rate to the aqueous reaction medium.

The computer control operation may additionally comprise continuously controlling sodium chlorate molarity in the aqueous reaction medium on the basis of continuously determined system mass balance and adaptive yield tracking.

The computer control operation may further comprise periodically laboratory testing the concentration of sodium chlorate in the reaction medium and monitoring the results of such laboratory testing for a trend in alteration of the concentration of the sodium chlorate in the reaction medium, determining whether or not the concentration of sodium chlorate in the reaction medium has changed in the same direction in a predetermined number of said periodic laboratory tests, in the event, such a change has taken place and provided that the operator has selected the "ADAPTIVE YIELD" function switch, initiating a yield calculation using a series of laboratory tests to determine the applicable adaptive yield.

The computer control operation may additionally comprise periodically laboratory testing the concentration of sodium chlorate in the reaction medium, determining whether or not the concentration of sodium chlorate in the reaction medium has changed from a target value, and in the event such a change has taken place and provided the operator has selected the "LAB TEST" function switch, applying a one-time bias to the flow rate of sodium chlorate to the reaction medium for a predetermined time to adjust the sodium chlorate concentration in the reaction medium to the target value.

The computer control operation may further comprise maintaining the level of reaction medium in the reaction zone substantially constant by continuously balancing the volume of water flowing to the process and the volume of water evaporated from the reaction medium.

In the computer control operation, the acid normality of the reaction medium and the concentration of sodium chlorate in the reaction medium may be continuously determined and displayed.

The reducing agent utilized in the chlorine dioxide generating process may be of those commonly employed in commercial chlorine dioxide generating operations, preferably a reducing agent which does not produce significant amounts of chlorine, such as hydrogen peroxide and methanol. The specific description herein is directed to the use of methanol as the reducing agent.

Where methanol is the reducing agent, the computer control system may further comprises continuously monitoring the production rate of aqueous chlorine dioxide solution, and modifying the feed rate of methanol to the reaction medium in response to fluctuations within a predetermined range based on the initial methanol flow set point.

The advanced control strategies illustrated in this invention (see FIG. 3 for schematic overview) include:
(a) Production Rate Initialization
(b) Dynamic Determination of Feed Rate Set Points
(c) Chlorate Feed Control
(d) Generator Liquor Acidity Control
(e) Production Rate Feedback Control
(f) Reboiler Steam Set Point Determination
(g) Generator Level Control
(h) Chlorine Dioxide Solution Strength Control
(i) Maximum Chlorine Dioxide Solution Strength and Solution Temperature Interlock Setting

GENERAL DESCRIPTION OF THE INVENTION

Figure 1:
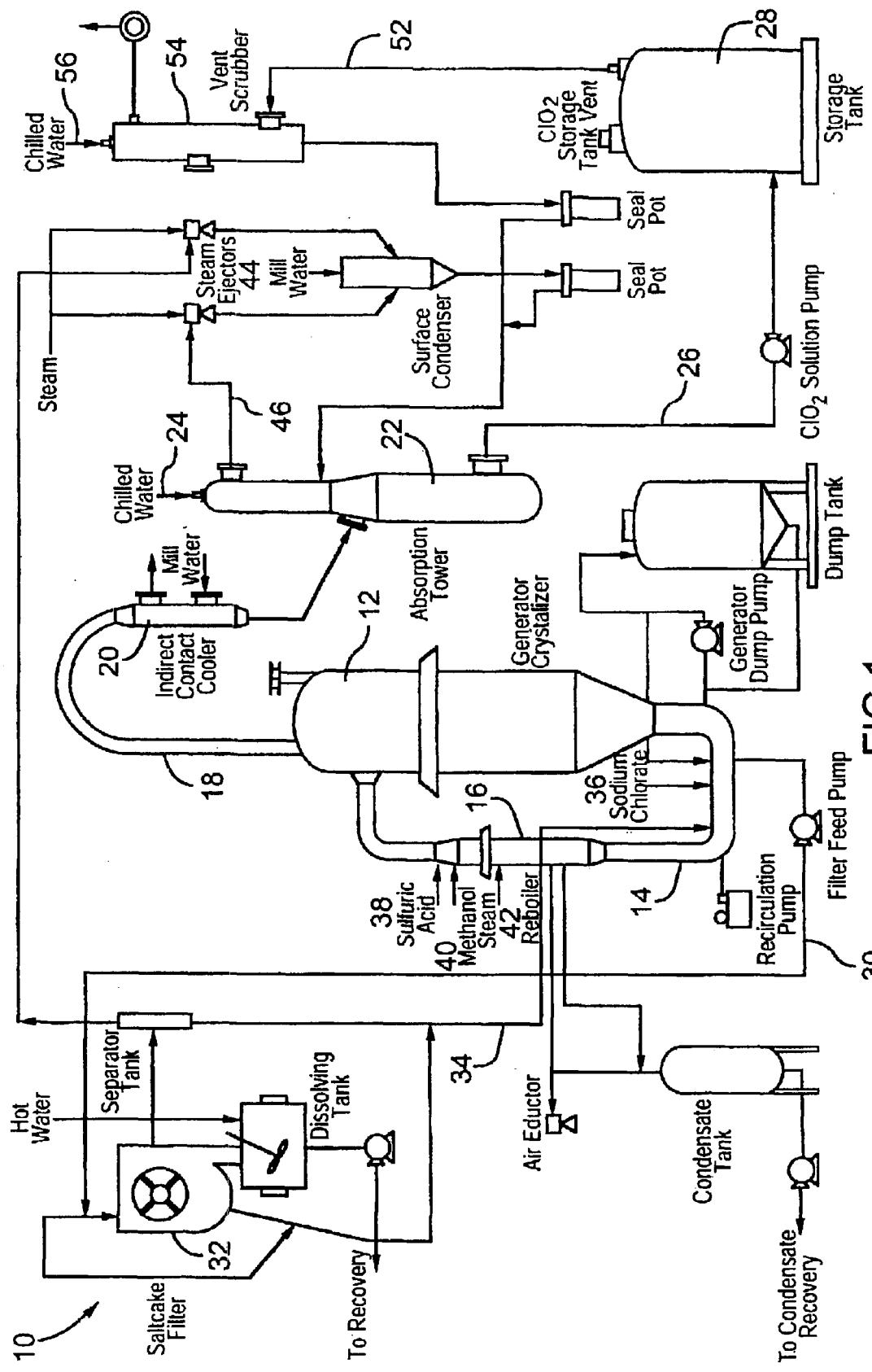
FIG. 1 is a schematic diagram of a methanol-based chlorine dioxide generating plant (R8®) which can be controlled according to one embodiment of the control strategies provided herein.

In the present invention, the full scope of chlorine dioxide generating plant operation can be monitored and controlled automatically by a computer programmed by software effecting the various monitoring and calculations. The chlorine dioxide production rate is the sole input variable required to be provided by the plant operator to the system. At times, due to various reasons, the plant may not produce the amount of chlorine dioxide expected from given flows of chemicals. The control system provided herein rapidly determines the degree of production rate deviation and makes the required adjustments to the methanol feed set point to maintain the desired production rate. Not only does the control system optimize steady state chlorine dioxide generating plant operations but also transitions between desired production rates, with continued stable operation. Stable generator level control at steady state, for example, ±1%, is achieved by the synergistic use of steam and make-up water. Water load and steam usage are minimized.

The present invention controls the chemical flows for optimal chemical usage at the target production rate. The chlorate concentration in the generator liquor is maintained within a narrow variation range, for example, ±0.2M (analysis error included), at the target production rate using adaptive yield compensation, as described below. The acidity of the generator liquor is controlled within a narrow variation range, for example, ±0.2N (analysis error included), at the target production rate by maintaining the liquor temperature at its set point being derived from the target generator liquor concentrations.

The chlorate feed concentration is calculated within good accuracy, for example, ±0.3% on the basis of a physical properties related algorithm, in the range of sodium chlorate concentration of about 450 to about 750 g/L.

The present invention enables there to be provided real time sodium chlorate and acidity predictors which can be displayed on the distributed control system (DCS) at the plant for reference. Instrumentation errors can be detected by the present invention and compensated for in most cases.

The enhanced accuracy in product aqueous chlorine dioxide solution strength provided by the present invention minimizes the production of "off spec" chlorine dioxide solution during changes in plant production rate, with consequentially-improved pulp mill bleaching. By monitoring the operating conditions of the chlorine dioxide generator, the recovery efficiency of the chlorine dioxide absorption tower is optimized. The highest possible chlorine dioxide solution strength that can be produced based on the advisory of maximum allowable chlorine dioxide solution strength under the existing operating conditions cannot be exceeded, so that product losses, environmental release and safety incidences may be avoided. With the production of the highest possible chlorine dioxide solution strength, existing storage capacity is maximized and chilled water consumption is minimized. The chilled water flow to the absorption tower is precisely calculated to maintain the chlorine dioxide solution strength at its set point following changes in production rate. By closely-controlling the operating conditions at the target production rate, a maximum and sustained reaction efficiency is achieved, resulting in a higher yield of aqueous chlorine dioxide solution based on the chlorate feed.

The present invention assists in reducing chemical costs, particularly chlorate; chemical losses due to production swings, disturbances at start-up; upsets, white-outs, liquor carry-over and environmental excursions; variation between target and operating parameters, such as generator level, liquor concentrations, chlorine dioxide strength and production rate; frequency of lab tests; and biological oxygen demand (BOD) loading through methanol consumption reduction.

The present invention assists in improving bleached pulp product quality, as a result of consistent chlorine dioxide concentration in the product chlorine dioxide solution leading to improved pulp brightness control; stability of chlorine dioxide generating plant operation; and troubleshooting ability.

The use of remote control of the chlorine dioxide generating plant operation, as contemplated in one embodiment herein, provides additional advantages over conventional local supervisory control, including remote software upgrades, maintenance and timely and enhanced technical service and support without the necessity for costly site visits, there being no risk in this mode of operation since any communication failure between central control centre and the remotely-controlled plant only results in controllers reverting to the local operator control as it is today.

The control strategies provided herein substantially enhance the operational stability of the chlorine dioxide generation process, which is the primary factor to affect the raw material usage. In addition, the maintenance of uniform operating conditions enables the process to maintain the optimal generation of chlorine dioxide. The consumption of the most expensive material, sodium chlorate, is saved significantly by the control system described herein.

Methanol consumption strongly relies on the generator liquor concentrations. With operation of the control system provided herein, the generator liquor concentrations are held constant and at the optimum, and as a result, methanol is utilized efficiently in the chlorine dioxide generating process. Therefore, there arises a chemical saving on methanol and a reduction on BOD load of the process.

In addition, the Advanced Control Strategies leads to saving on utilities, especially on the reboiler steam as a result of minimum use of make-up water in generator liquor level control. A chemical saving is realized at the bleach plant utilizing the chlorine dioxide solution, that is benefited from high and consistent strength of chlorine dioxide product.

DESCRIPTION OF PREFERRED EMBODIMENT

Referring to the drawings, FIG. 1 is a schematic diagram of a methanol-based chlorine dioxide generating plant 10 which employs subatmospheric pressure and boiling reaction conditions to produce chlorine dioxide from sodium chlorate, sulfuric acid and methanol.

As may be seen therein, the plant 10 includes a single vessel generator-evaporator-crystallizer 12 which has a recycle loop 14 which includes a reboiler 16. A gaseous product pipe 18 leads from the generator 12 through an indirect contact cooler 20 to an absorption tower 22, to which chilled water is fed by line 24. Chlorine dioxide solution is fed by line 26 from the absorption tower 22 to a chlorine dioxide solution storage tank 28.

A slurry of crystalline sodium sulfate by-product and spent generator liquor which enters the recycle loop 14 at the lower end of the generator 12 is pumped by line 30 to a salt cake filter 32 wherein the by-product sodium sulfate is separated from spent generator liquor, which then is returned to the recycle loop 14 by line 34.

A feed line 36 for aqueous chlorate solution is provided upstream of the reboiler 16 while feed lines 38 and 40, respectively for sulfuric acid and aqueous methanol solution, are provided downstream of the reboiler 16. Steam is fed to the reboiler 16 by line 42 to maintain the aqueous acid reaction medium in the generator 12 at the desired reaction temperature and to evaporate all water inputs from all sources.

The aqueous acid reaction medium in the generator 12 is maintained at its boiling point by applying a subatmospheric pressure to the generator 12 by employing steam ejectors 44 connected to the absorption tower 22 by line 46. The chlorine dioxide storage tank 28 is provided with a vent line 52 to a vent scrubber 54 to which chilled water is fed by line 56 to scrub chlorine dioxide from the vent gas stream.

In accordance with the present invention, the production of chlorine dioxide by the operation of the chlorine dioxide generating plant shown in FIG. 1 is controlled to provide a desired production rate of chlorine dioxide. The sole input parameter required by the predetermined control system is the production rate. Based on this parameter, the other parameters and operating condition of the process automatically are varied to meet the target production rate.

The operating parameters of the chlorine dioxide generating process are controlled by the control system, by receiving inputs of instantaneous values of various parameters of the process and adjusting flows and conditions as required to optimize the values which result in a predetermined production rate for chlorine dioxide. The production rate of chlorine dioxide is the determining parameter with respect to operation of the control system.

Figure 2:
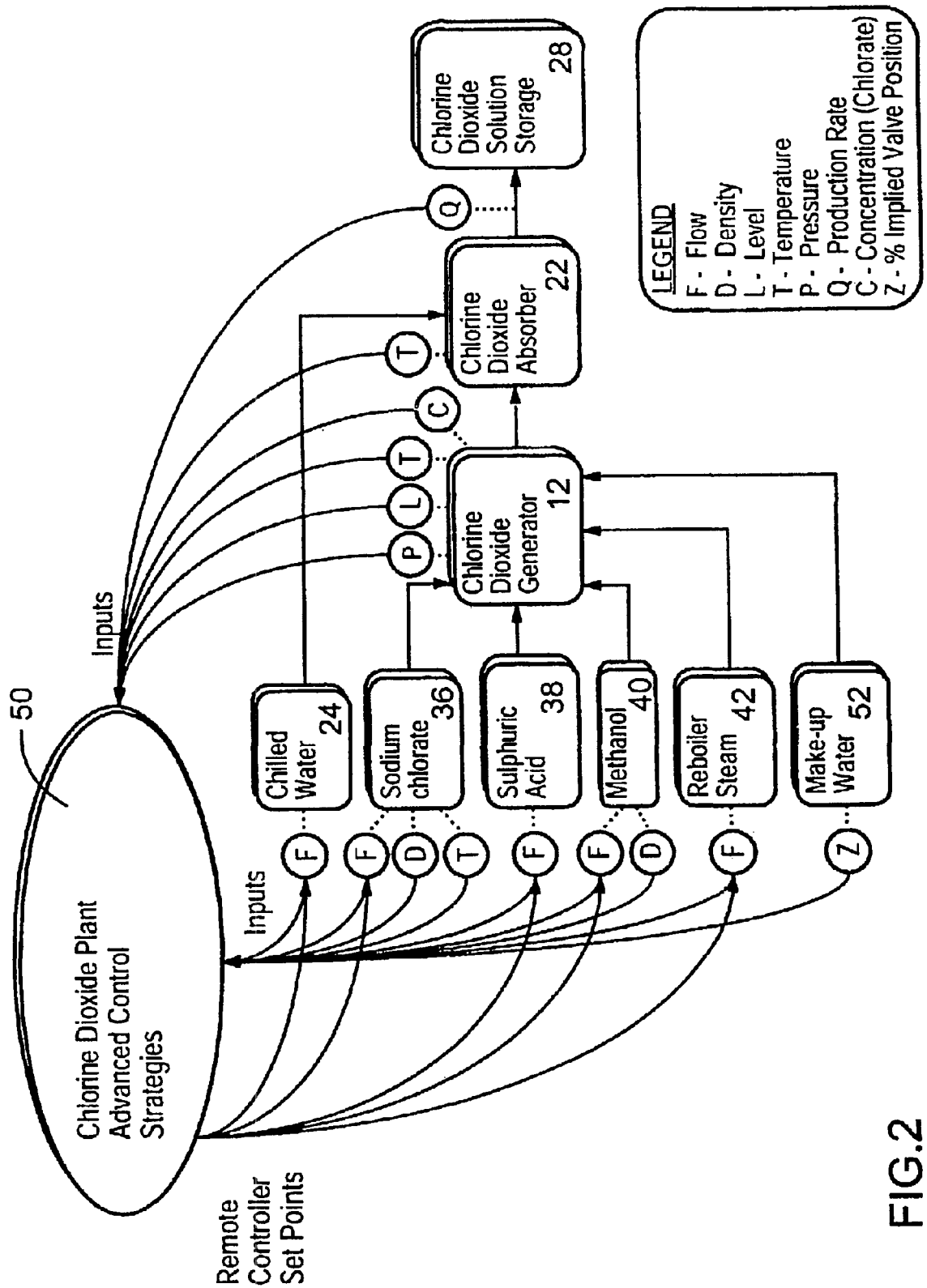
FIG. 2 is a schematic diagram of all inputs and outputs of the chlorine dioxide generating process control strategy provided herein.

As may be seen in FIG. 2, production rate is an input value to the control system 50, the operation of which is described below with reference to FIGS. 3 to 13.

Other inputs include chlorine dioxide absorber temperature, chlorine dioxide generator pressure, liquid level, temperature and chlorate concentration. As noted above, chilled water is fed to the chlorine dioxide absorber 22 while sodium chlorate, sulfuric acid, methanol and reboiler steam are fed to the chlorine dioxide generator. Each of these liquid feeds as well as make-up water (not shown) have feed rates which are monitored and controlled by the control system 50. The density of the sodium chlorate solution and methanol also are monitored by the control system 50.

The operating parameters for the chlorine dioxide generation process are selected from those normally encountered in a methanol based chlorine dioxide generating process and maintained at the respective values.

Turning now to FIGS. 3 to 13, FIG. 3 shows the overall control scheme. The overall control scheme is contained within a computer program run by a suitable microprocessor. As mentioned above, target production rate is the input determinative of the operation of the control system. This input is introduced manually by an operator. A deviation in production rate from the target causes the system to make suitable adjustments to return the process to the existing production rate target.

Figure 4:
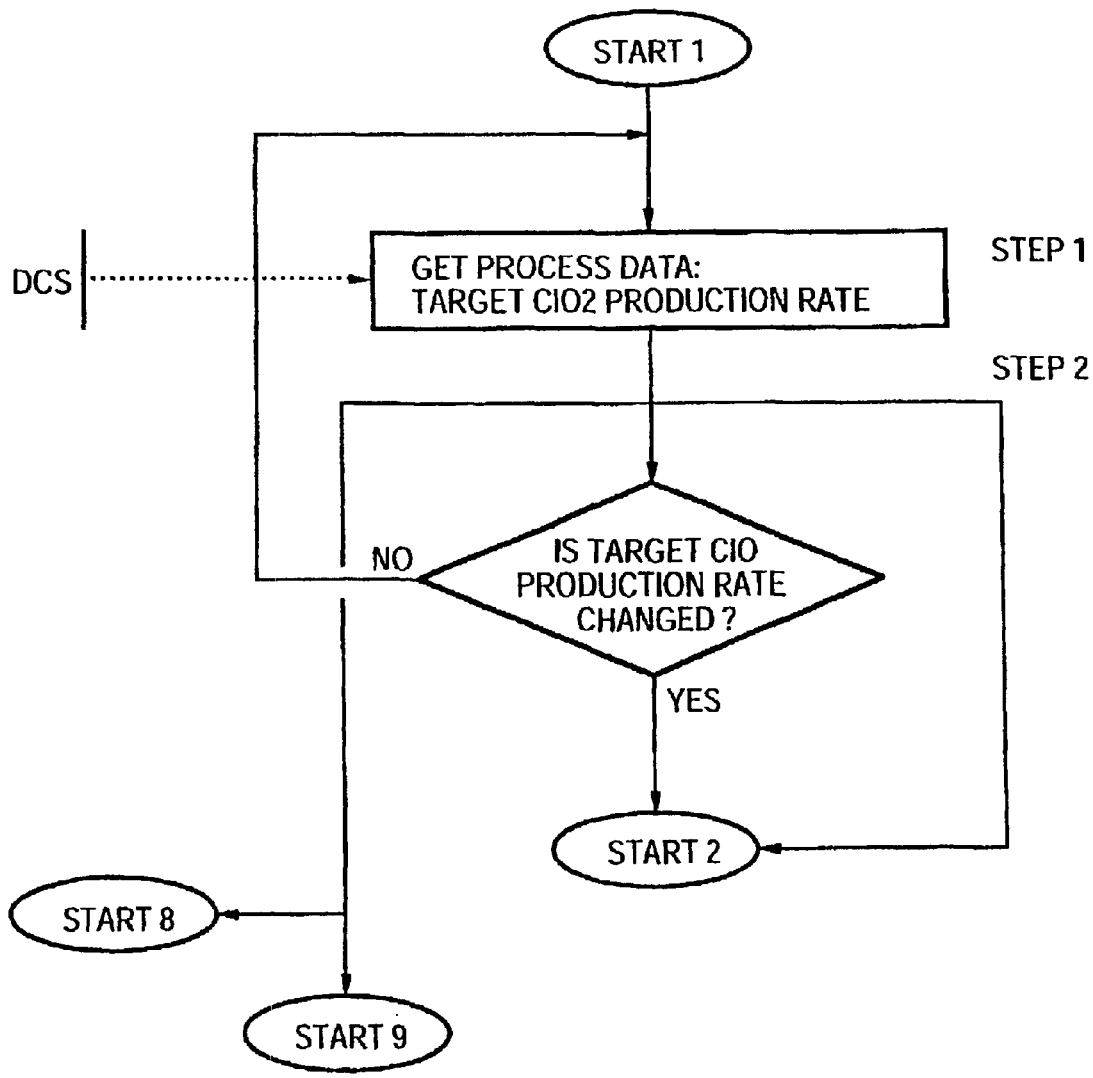
FIG. 4 is a flow chart showing the steps involved in chlorine dioxide production rate initialization.

As seen in FIG. 4, the target chlorine dioxide production rate is inputted from the DCS and the control system detects whether there is any change in production rate. In the event that there is a change in production rate, a signal initiates START 2 to initiate changes in feed set points, as described below.

The conventional operation of a chlorine dioxide generation plant does not involve chlorine dioxide production rate initialization, unlike the present invention, but rather all chemical feed set points are manually inputted in the conventional system to achieve a target production rate. This invention uses the target production rate as a trigger to initialize subordinate control strategies in a logical sequence in order to achieve smooth transitions from one target chlorine dioxide production rate to the next.

The control strategies provided herein have shown a superior ability to handle transitions, for instance, at the time of production rate change. A large jump in production rate was experimented with and the chlorine dioxide strength, which generally is the first parameter sensitive to process swings, was maintained close to the set point while passing the transition period to the new production rate.

Figure 5:
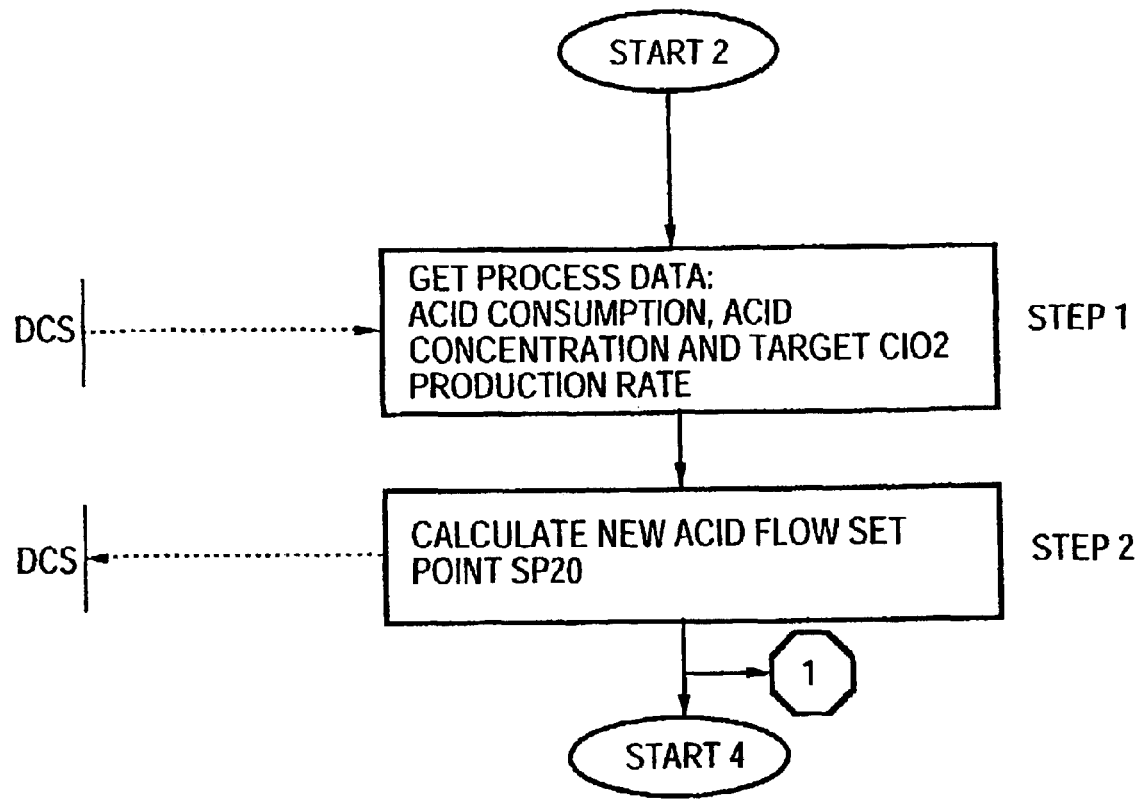
FIG. 5 is a flow chart showing the steps involved in the sulfuric acid set point determination.

START 2 initiates acid flow, methanol dilution water and chilled water set point determinations, which provide new set point determination responsive to the change in target chlorine dioxide production. As seen in FIG. 5, the control system provides information relating to the existing sulfuric acid consumption, sulfuric acid concentration and target chlorine dioxide production rate and then the new sulfuric acid flow set point (SP20) is calculated, which is forwarded to the DCS to effect the necessary adjustment in sulfuric acid flow and a signal initiates START 4.

Figure 6:
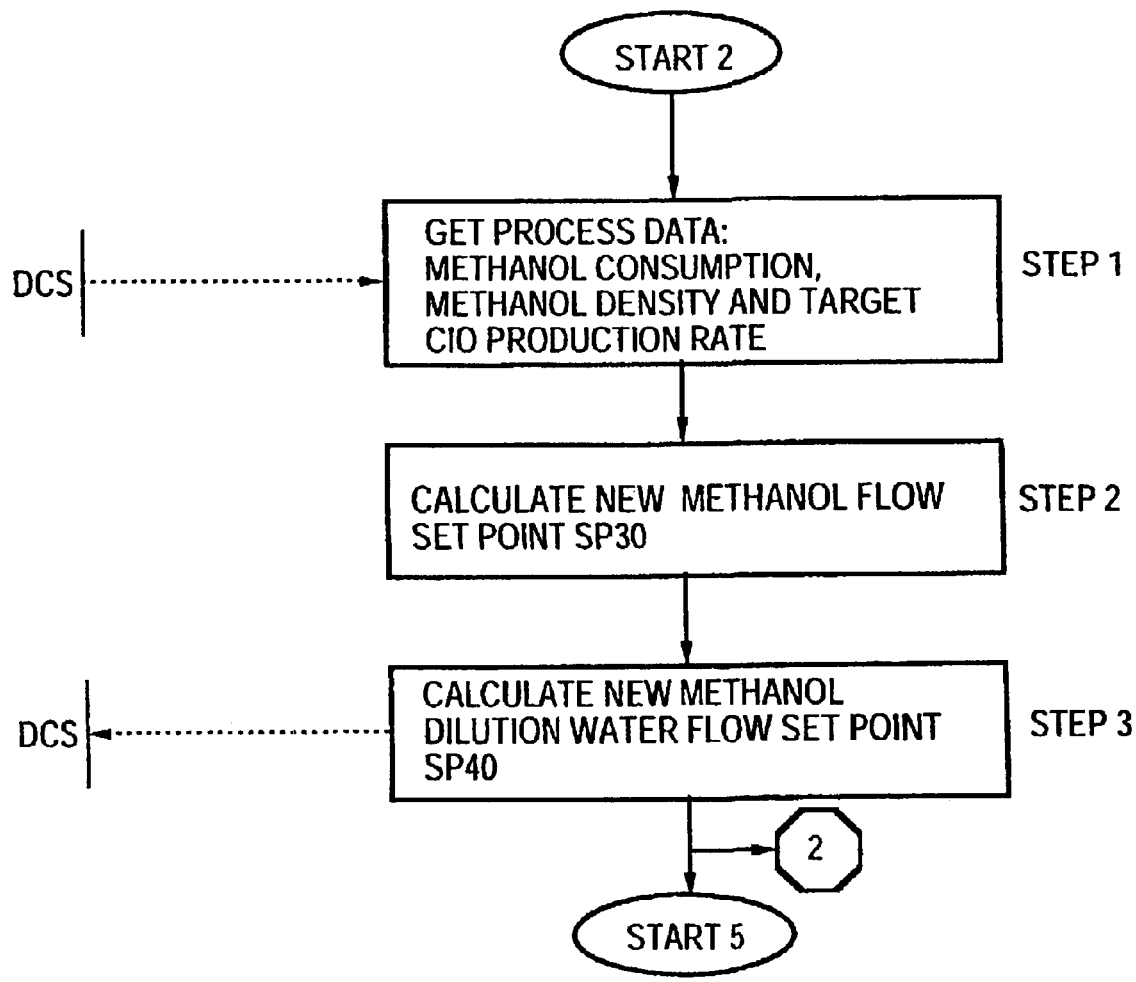
FIG. 6 is a flow chart showing the steps involved in the methanol dilution water set point determination.

As seen in FIG. 6, the DCS provides methanol consumption, methanol solution density and target chlorine dioxide production rate and then the control system calculates the new methanol flow set point and the new methanol dilution water flow set point (SP30) which is fed to the control system to effect the necessary adjustment and a signal initiates START 5.

Figure 7:
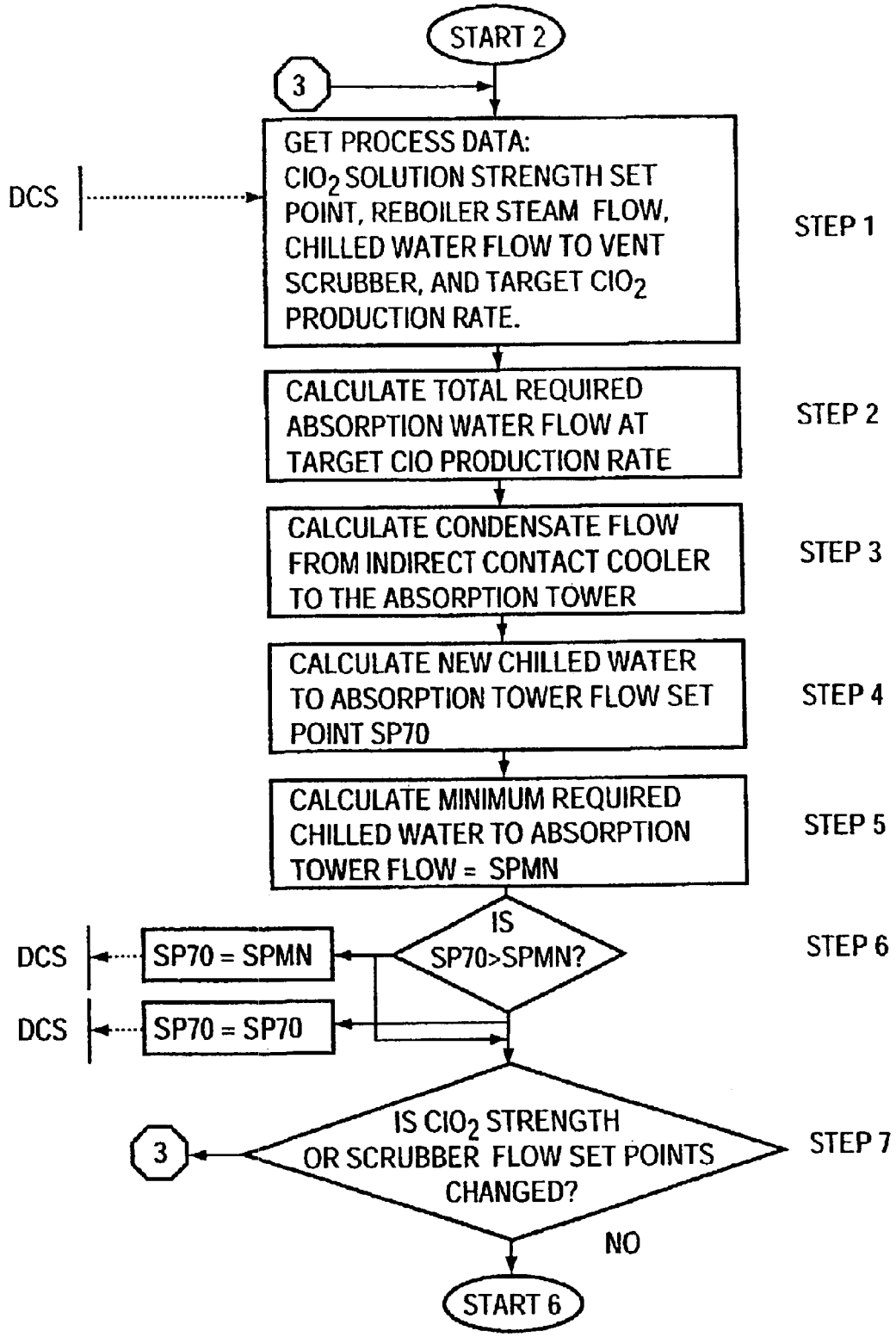
FIG. 7 is a flow chart showing the steps involved in the set point determination for the flow of chilled water to the absorption tower.

As seen in FIG. 7, the DCS provides chlorine dioxide solution strength set point, reboiler steam flow, chilled water flow to vent scrubber and target chlorine dioxide production rate, then the control system calculates the total required absorption water flow at the target production rate, calculates the condensate flow from the indirect contact cooler to the absorption tower, calculates the new chilled water to absorption tower flow set point (SP70). The minimum chilled water to absorption tower flow (SPMN) is calculated and a comparison is made to determine if SP70 is greater than SPMN in order to ensure that the chilled water flow would never drop below the minimum SPMN. If the answer is no, then the SP70 value is set as the calculated SPMN value and then this value is fed to the DCS to make the adjustment. If the answer is yes, then the SP70 value is set as the calculated SP70 value and then this value is fed to the DCS to make the adjustment.

In addition, a further query is made as to whether the chlorine dioxide strength or the scrubber flow set points have changed. In the event the answer is no, then a signal initiates START 6. If the answer is yes, then the loop returns and adopts the new values of $ClO_2$ solution strength and/or vent scrubber tower flow for re-calculation.

In contrast to the control strategies outlined in FIGS. 5 to 7, the conventional operation employs a "Hardcopy Feed Table" as a guideline for operators to set all flows for the target production rate. This table is created on the basis of stoichiometry and a number of assumptions, including constant methanol consumption and density, chlorate strength, and plant yield, which may be incorrect. This invention makes the feed-forward set points dynamic, whereby the flow set points of acid, methanol, steam and chilled water are calculated based on a given chlorine dioxide production target, specifications of chemical supply and directly measured operating conditions and the set points are changed dynamically as the material specifications vary. This strategy allows the initial and ongoing flow set points to be as precise as possible, unlike the conventional rigid feed chart.

Figure 3A:
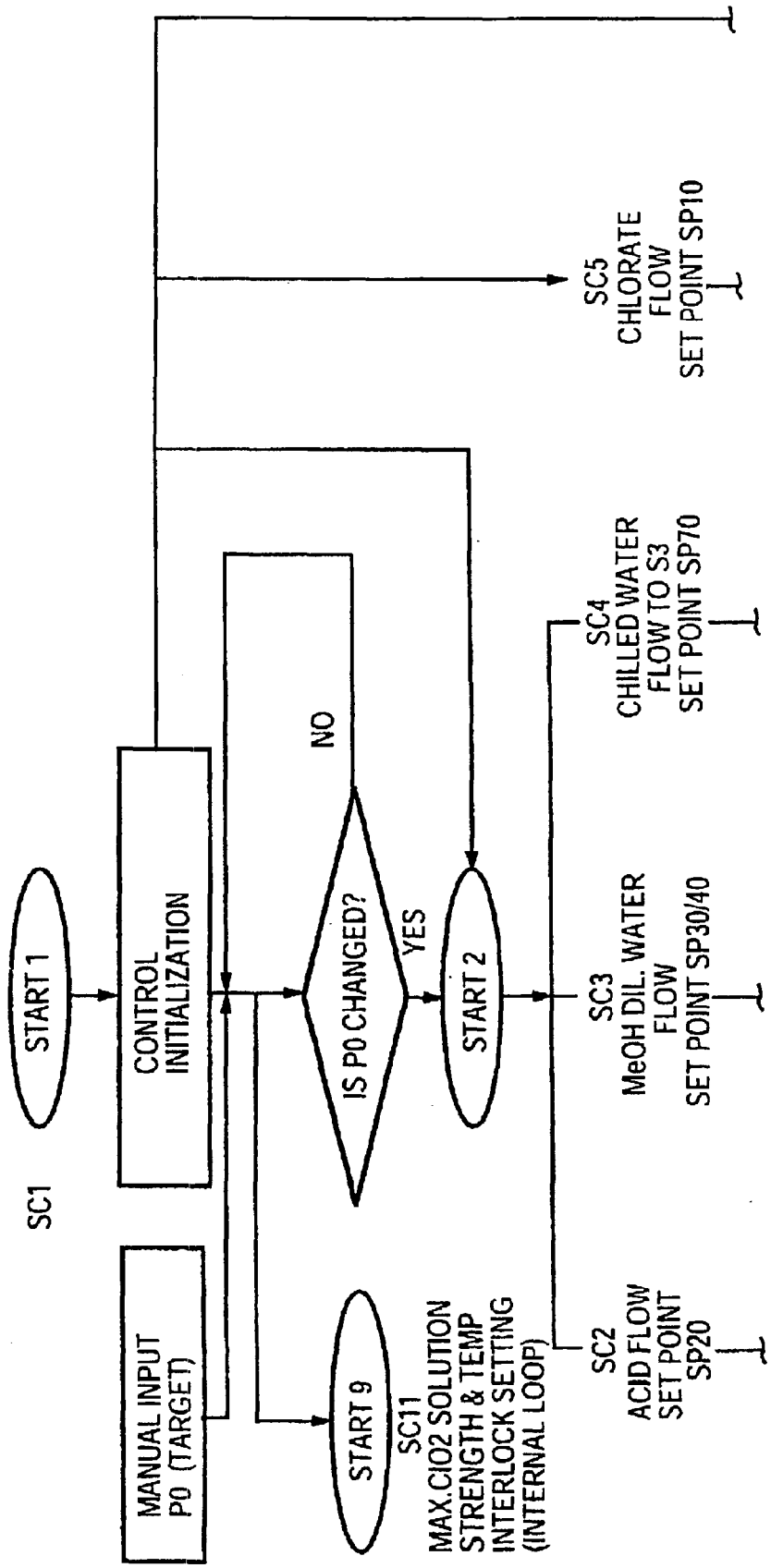
FIG. 3 is an overall flow chart for the chlorine dioxide generating process control strategy provided herein.
Figure 3B:
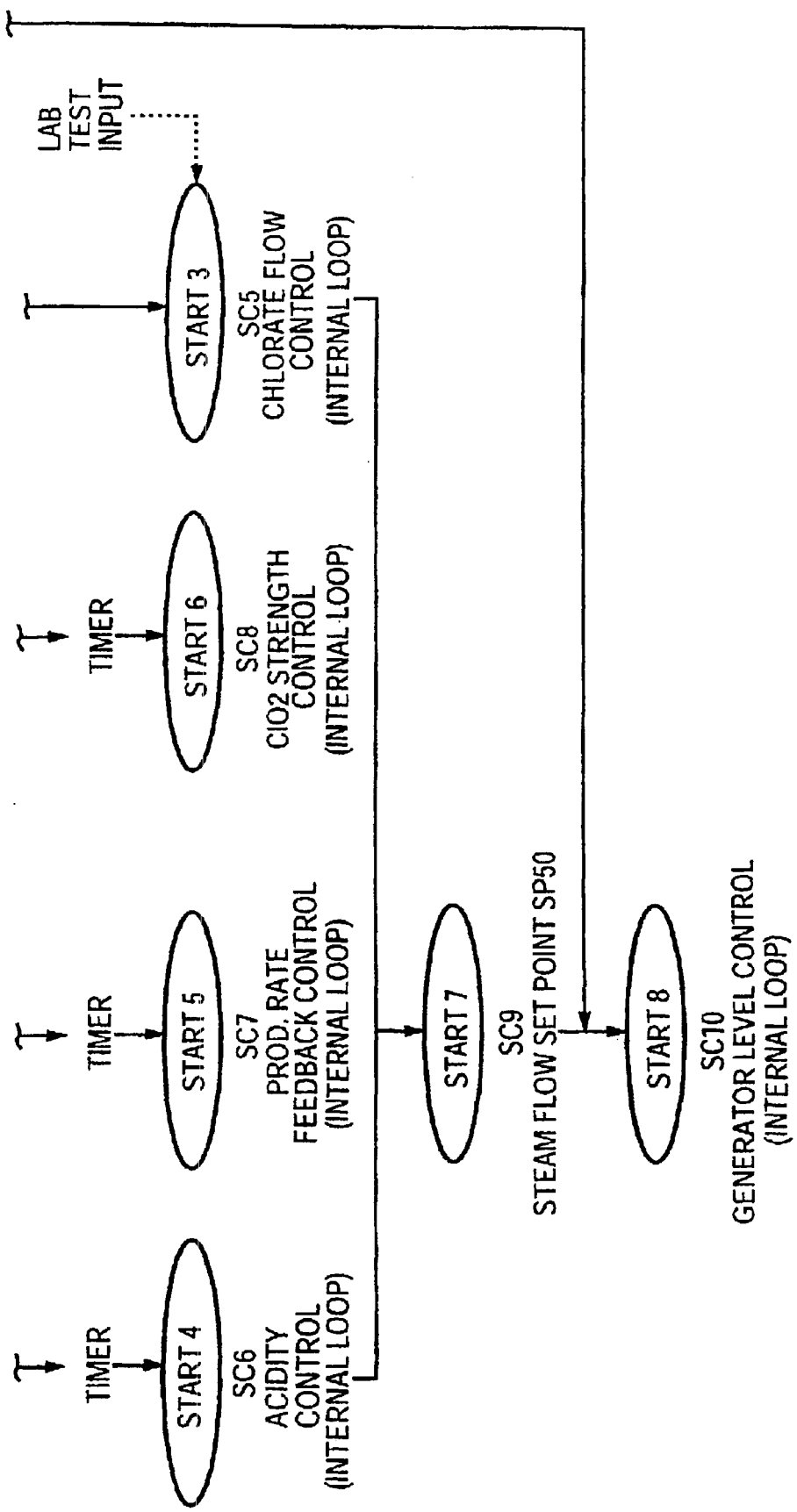
Figure 8A:
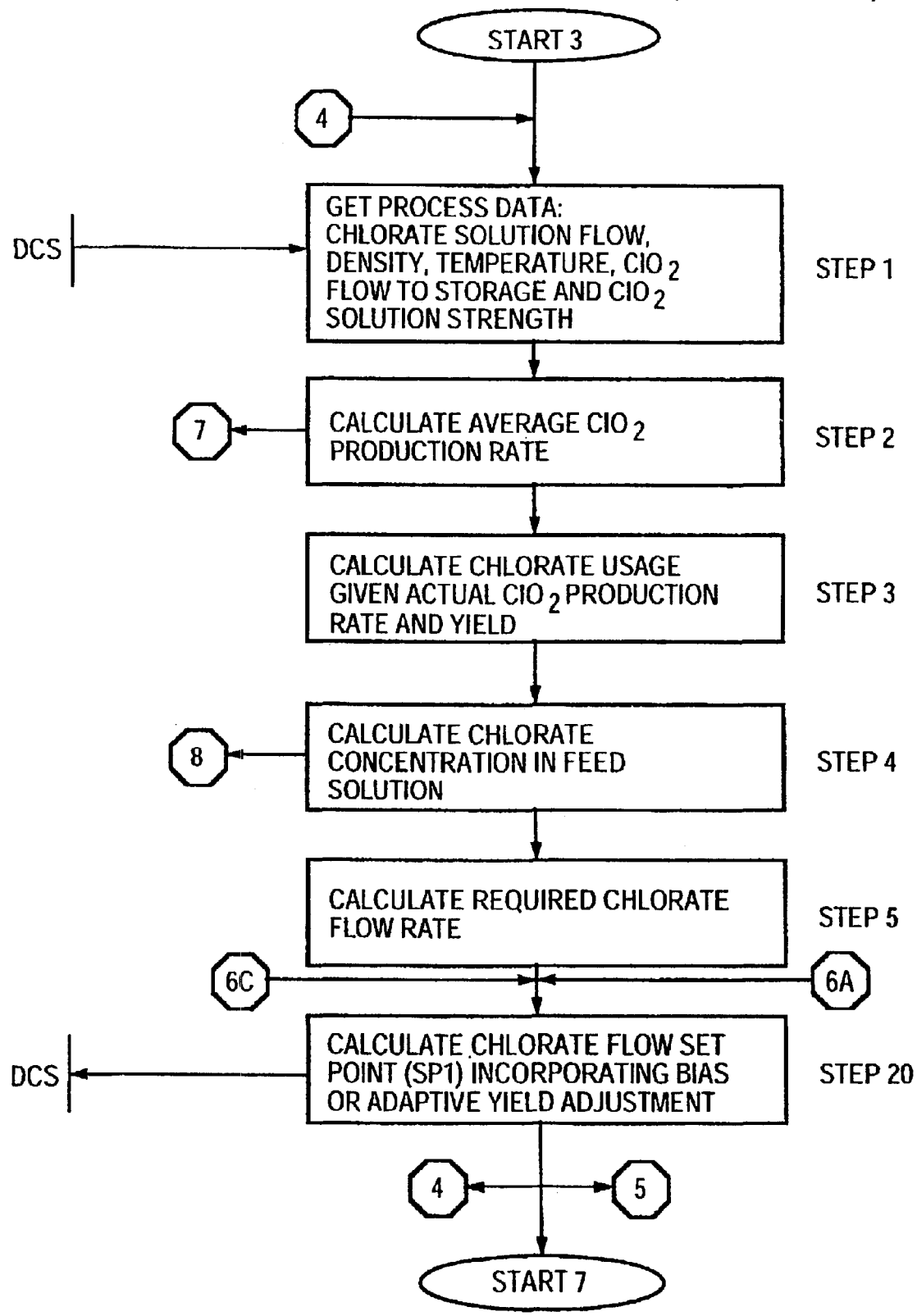
FIGS. 8A, 8B and 8C represent a flow chart showing the steps involved in the feed flow control of sodium chlorate solution.
Figure 8B:
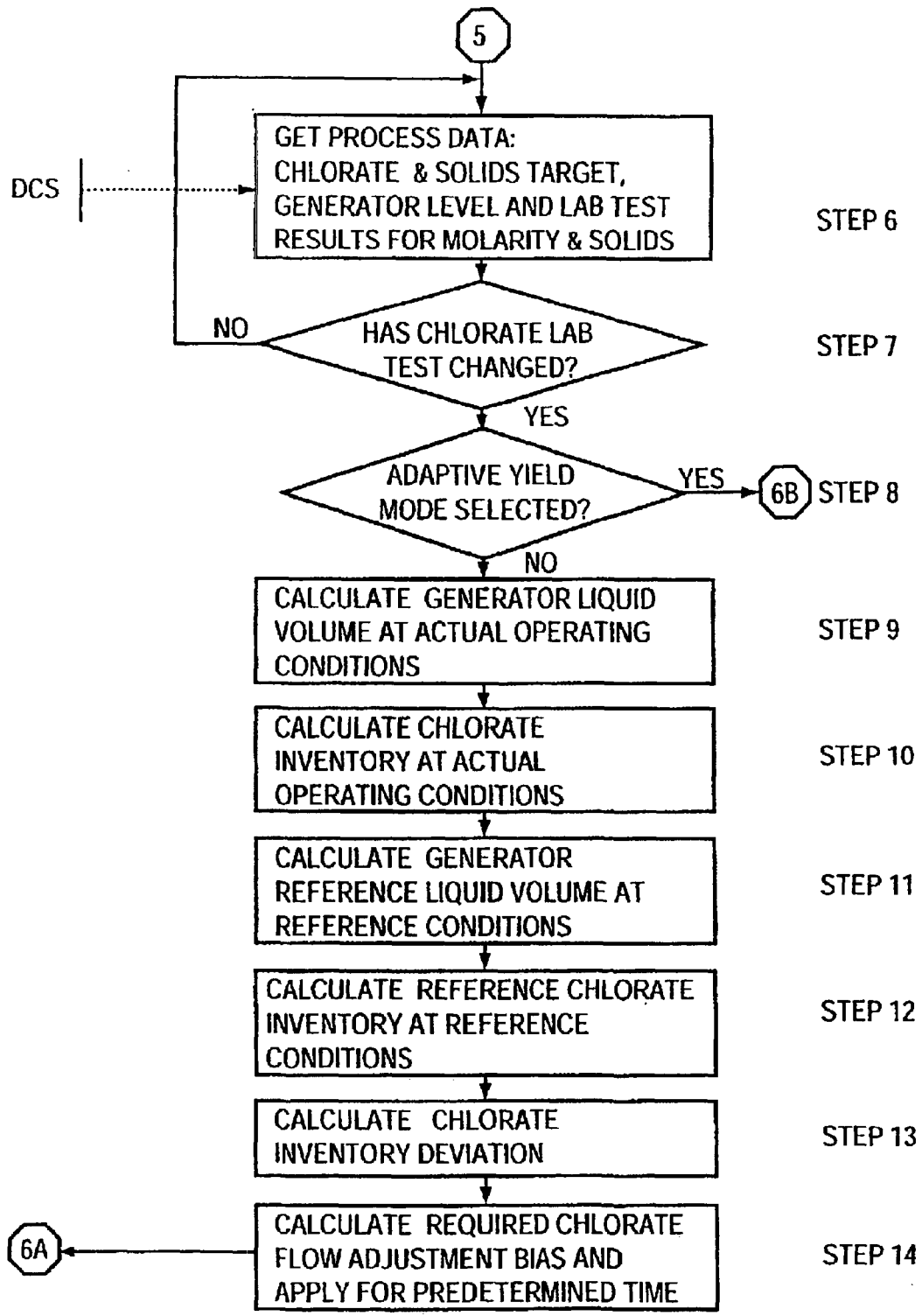
Figure 8C:
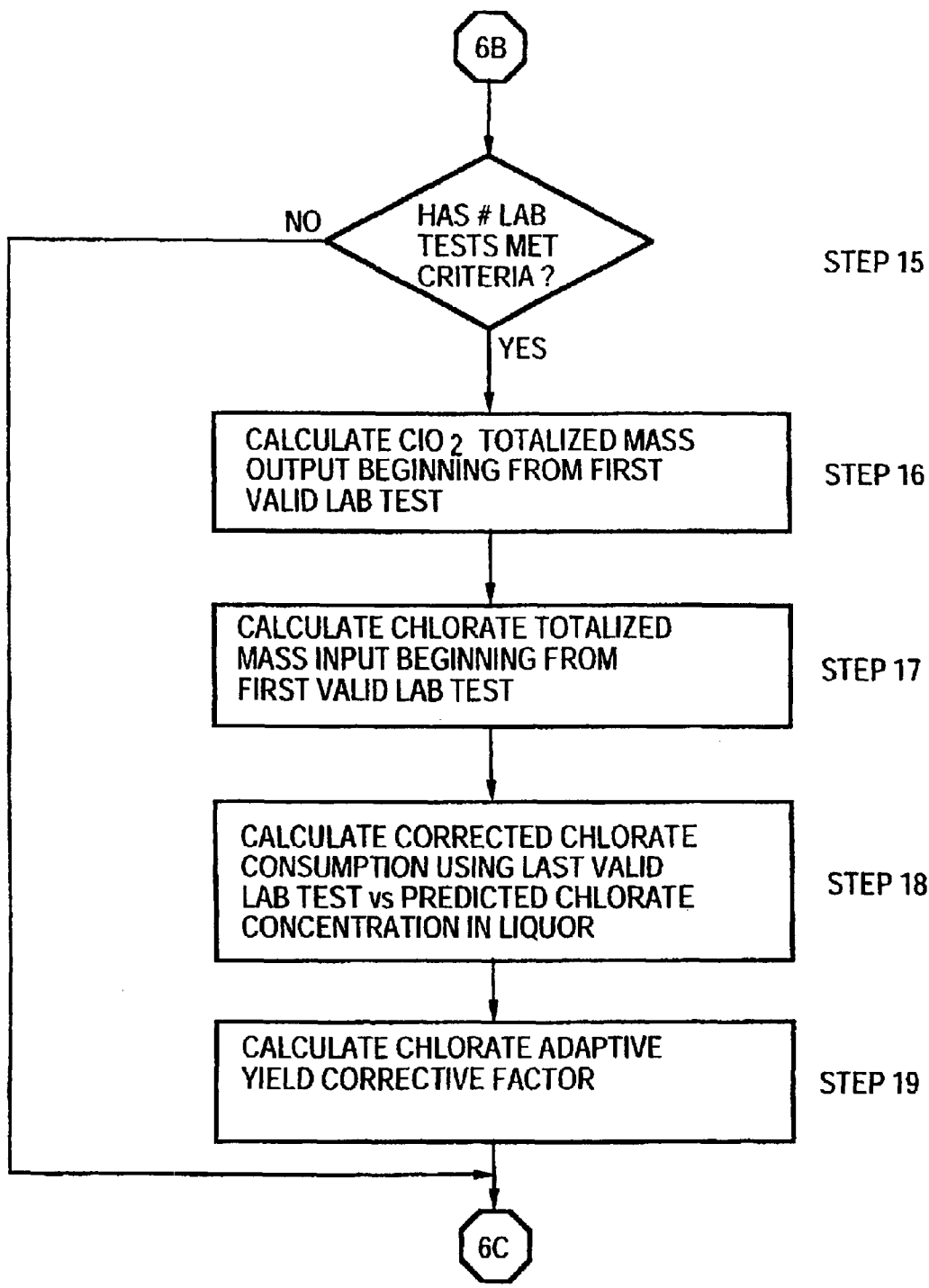

In FIGS. 8A, 8B and 8C, there is shown the procedure for sodium chlorate solution feed control. As seen in FIG. 3, control initialization assigns the first chlorate flow set point (SP10) and a signal initiates START 3. Information relating to sodium chlorate solution flow, density, temperature, chlorine dioxide flow to storage and chlorine dioxide solution strength is provided from the DCS and then calculates average production rate, which generates a signal (7) for the chlorine dioxide production rate feedback control (see FIG. 10). The sodium chlorate usage at the actual chlorine dioxide production rate and yield is then calculated, followed by calculation of the chlorate concentration in the feed solution. This latter calculation generates a signal (8) for the reboiler steam flow set point determination (see FIGS. 11A, 11B). The required chlorate flow rate to match the chlorate consumption then is calculated. This value along with inputs 6A or 6C (see below) then are used to calculate the chlorate flow set point incorporating bias and yield adjustment, as described below, and the resulting signal is forwarded to the DCS. The signal also initiates START 7, is looped internally (5) and is used in further control of the chlorate feed flow (7).

As seen from the above description of FIGS. 8A to 8C, the operator has the option to either rely on full complete control using the "ADAPTIVE YIELD" function switch, (FIGS. 8A and 8C), or to select the "LAB TEST" function switch for a one-time flow bias adjustment (FIGS. 8A and 8B).

As seen in FIG. 8B, the chlorate flow signal 5 is inputted along with information relating to chlorate morality and percent solids targets, generator level and lab test results for chlorate morality and percent solids. Subsequently, it is determined whether the chlorate lab test information has changed. In the event, the answer is no, a closed loop is established. In the event, the answer is yes, then it is determined whether the adaptive yield mode, as described below, is selected. If the adaptive yield is selected, then a signal (6B) is generated from which further calculation are made (see FIG. 8C). If the adaptive yield is not selected (i.e. lab test mode is selected), then there are sequentially calculated the generator liquid volume at actual operating conditions, the chlorate inventory is calculated at actual operating conditions, the reference liquid volume at reference conditions, the reference chlorate inventory at reference conditions and the chlorate inventory deviation between the actual and reference conditions. The chlorate flow adjustment bias then is calculated and the signal (6A) applied for a predetermined time to the calculation of the chlorate flow set point (FIG. 8A).

If the adaptive yield is selected, then a comparison is made as to whether or not the number of lab tests performed has met the basic criteria. If not, then the further calculations are by-passed until there have been a sufficient number of lab tests performed to meet the criteria. If yes, then there are sequentially calculated the chlorine dioxide totalized mass output beginning from the first valid lab test, the chlorate totalized mass input beginning from the first valid lab test, the corrected chlorate consumption using the last valid lab test in comparison to the predicted chlorate concentration in the liquor and the chlorate adaptive yield correction, the signal of which is used to calculate the chlorate flow set point (FIG. 8A).

In contrast to the aqueous sodium chlorate feed control strategy illustrated in FIGS. 8A to 8C, the conventional operation in a chlorine dioxide generator is to make manual adjustments to the chlorate feed flow based on results of manual chlorate molarity laboratory tests on generator liquor. Adjustments are made assuming constant chlorine dioxide production, generator volume, yield and chlorate feed strength, which may be incorrect.

In the present invention, an on-line virtual chlorate solution analyzer is provided that reports the real volumetric concentration of chlorate solution being used in the process based on solution physical properties, temperature and density. Taking advantage of the on-line chlorate solution analyzer, it becomes feasible to monitor the mass input of chlorate to match the consumption that is known from the chlorine dioxide production as well as predetermined chlorate yield, such that the chlorate inventory in the generator liquor indicated by the chlorate molarity is constant, which leads to operational stability.

This invention has developed an empirical relationship of chlorate solution density-temperature-concentration correlation based on conventional standard relationships. The empirical relationship is proven to be accurate within 0.3% relative error in the aqueous chlorate solution concentration range of about 450 to about 750 gpl. The on-line chlorate solution concentration signal is used in the continuous mass balance control. This control strategy makes continual adjustments on chlorate flow rate applying the averaged chlorine dioxide production rate as well as the chlorate concentration determined by the relationship. The chlorate molarity in the generator liquor thus is controlled by system mass balance and adaptive yield tracking. Moreover, automatic bias adjustments may be made to chlorate feed flow after each laboratory test result is entered as described above with respect to FIGS. 8A and 8B.

Alternatively, the chlorate feed control is governed by adaptive yield, whereby the chlorate yield, namely the molar ratio of chlorine dioxide produced to actual chlorate used, is derived and adjusted periodically based on changes in the inventory of sodium chlorate in the generator liquor calculated from a series of lab tests.

As described above with respect to FIGS. 8A and 8C, in the adaptive yield mode mentioned above, the lab test data of chlorate molarity are saved and monitored for their trend. In the event the chlorate concentration value in the generator liquor moves three times in a row in the same direction and does not pass the target, a yield calculation is initiated using the lab tests to determine the chlorate mass inventory changes. The inventory changes then are used to adjust the adaptive chlorate yield. As the chlorate mass inventory in the chlorine dioxide generator liquor rises, the yield is to be lowered while decreasing chlorate mass inventory in the chlorine dioxide generator liquor suggests a higher yield. By performing such determination, the lab test data are not only used to create a one-time input bias to the chlorate feed, but also to direct the predetermined yield to the true value thus ensuring the chlorate input is in the balance with the consumption to produce chlorine dioxide.

The concept of adaptive yield employed herein recognizes that the plant instrumentation may contain some errors and the system factors affecting yield, such as instrumentation errors and the process characteristics, reaction efficiency and physical losses, may vary from time to time. With adaptive yield, the system is able to maintain its stability in the ever-changing environment by following the steps described above.

The concept of adaptive yield employs trend analysis rather than using a single lab test, so that the effect of errors associated with the sample analysis can be minimized. For instance, one point of off-trend line test can be ignored and the disturbance to the chlorine dioxide generating process that such test could have caused is averted.

A generator chlorate molarity predicator may be shown on the DCS at the chlorine dioxide generator plant, based on a comparison of mass input and output, as described above. The predictor serves to indicate to the plant operator the transition of chlorate molarity from one state to a new balance.

Figure 9:
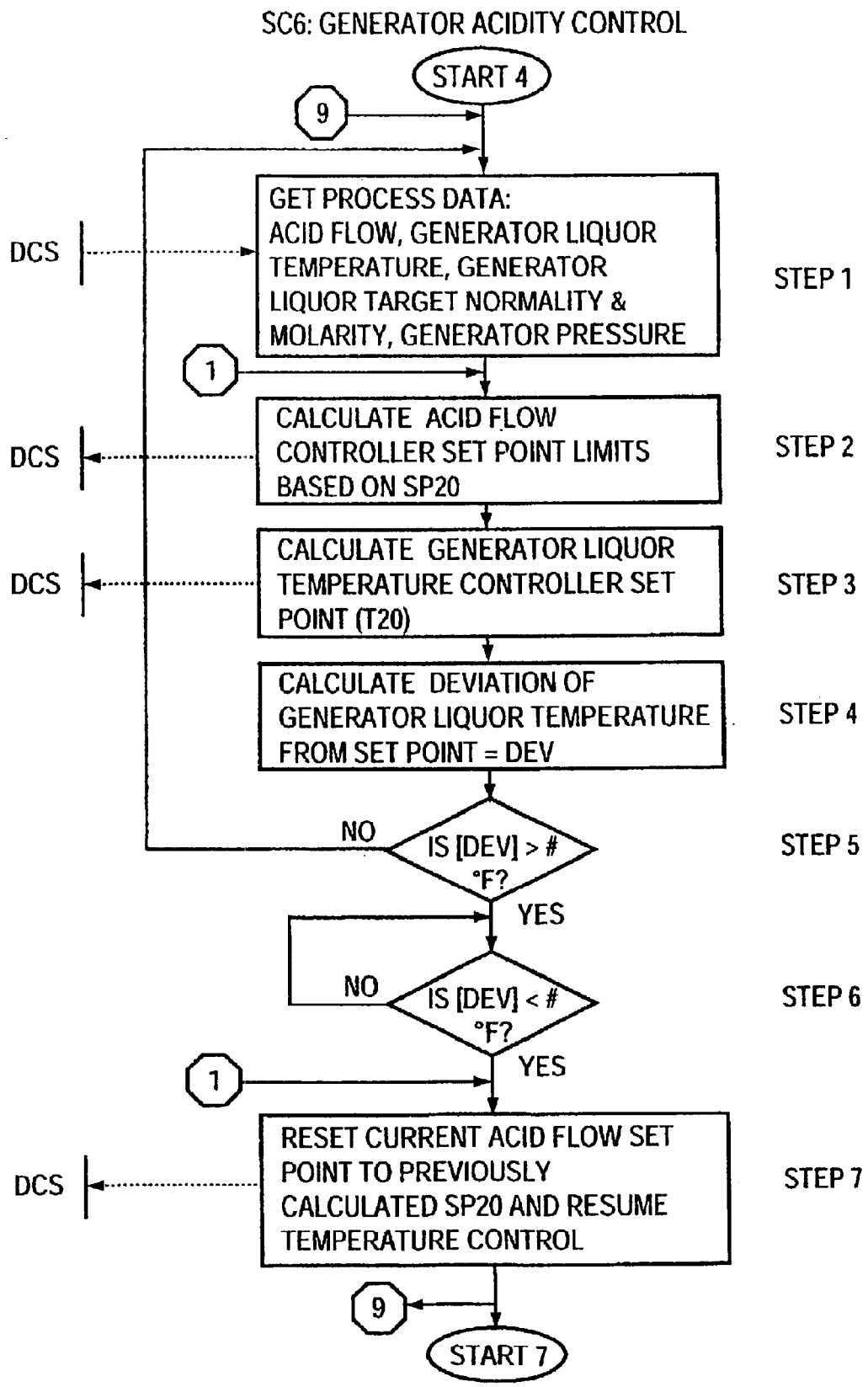
FIG. 9 is a flow chart showing the steps involved in chlorine dioxide generator acidity control.

FIG. 9 shows the steps taken in the generator liquor acidity control. Information relating to sulfuric acid flow, generator liquor temperature, generator liquor target normality and molarity and generator pressure is provided from the DCS and the acid flow set point limits are calculated from the acid set point signal 1 (SP20) and the resulting signal is fed to the DCS. The generator liquor temperature controller set point (T20) next is calculated and also sent to the DCS. The deviation of generator liquor temperature from the set point is calculated and a determination is made if the deviation is greater than a permitted value (A'). If the answer is no, then the signal loops to the start of the calculation. If the answer is yes, then a determination is made if the deviation is less than the permitted value (A"). If the answer to the latter determination is no, then the signal loops back to the start of the calculation. If the answer to the latter determination is yes, then along with the calculated new acid flow set point (input 1, see FIG. 5), the current acid flow set point is reset to the previously calculated acid flow set point that is forwarded to the DCS and looped internally. Due to long time delay in response, it was experienced that a simple acid flow-liquor temperature control loop would encounter long lasting swings, especially when upsets occurred. A one-time acid flow correction, as effected herein, enables the liquor temperature to return rapidly to its set point and swings cease. This latter signal triggers START 7.

The conventional procedure for generator acidity control is to make manual adjustments to the acid feed flow based on results of acid normality laboratory tests on generator liquor. Adjustments are made assuming constant chlorine dioxide production, generator volume and acid consumption which may be incorrect. This invention does not require the acidity laboratory test but instead manipulates the acid feed flow as a function of generator liquor temperature (i.e. boiling point) alone, with the initial acid flow set point given by the mass balance calculation such that the starting set point is as close as possible to the real acid requirement.

This invention has developed an empirical relationship based on known considerations of boiling point to liquor composition to determine the desired generator liquor temperature control set point. The computer-assigned temperature control set point is derived from expected liquor composition, i.e. chlorate molarity and acid normality. In the case of the liquor temperature deviating excessively from the set point, a threshold is set and the acid flow is subjected to a one-time acid flow correction that can bring the liquor temperature back to the set point quickly and prevent the liquor temperature from cycling.

The relationship of generator liquor composition and its boiling point may be expressed as:

$$T20 = a(A + bC) + cP + d$$

Where T20 is the generator liquor temperature set point, A is acid normality, C is the chlorate molarity, P is the generator pressure and a, b, c and d are factors.

Based on the determined information relating to the parameters of the generator liquor, an acid normality predictor may be shown on the DCS at the plant for operator information. Without any laboratory chemical testing, the predictor advises the acid normality in the generator liquor based on the current temperature and chlorate molarity.

In this acid normality control strategy, acid flow correction as described above effectively minimizes temperature swings. As the system detects an excessive liquor temperature deviation, the system initiates a flow correction as the temperature moves back and close to the set point.

Figure 10:
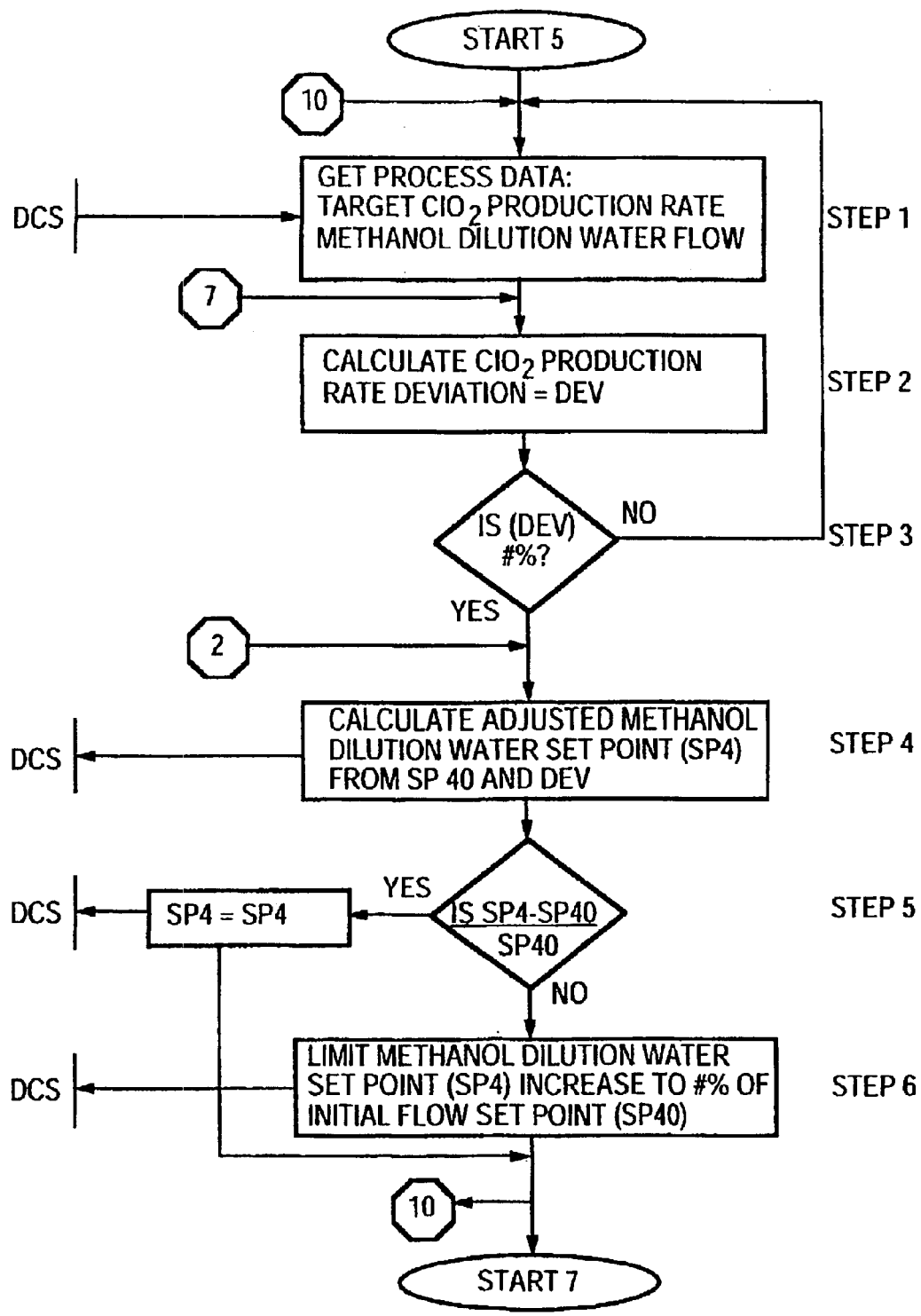
FIG. 10 is a flow chart showing the steps involved in chlorine dioxide production rate feedback control.

FIG. 10 shows the steps involved in chlorine dioxide production rate feedback control. Information relating to the target chlorine dioxide production rate and methanol dilution target flow is received from the DCS while the calculated average chlorine dioxide production rate is received as signal 7 (FIG. 8A) and the chlorine dioxide production rate deviation (DEV) is calculated. If the deviation is less than a predetermined percentage, the signal loops to the start of the calculation, while, if the deviation is greater than the predetermined percentage, then along with the calculated new methanol dilution water flow set point ((SP40), FIG. 6), the adjusted dilution water set point (SP4) is calculated from the deviation and the calculated water flow set point and the signal sent to the DCS.

A determination next is made whether the relationship $$\frac{SP4 - SP40}{SP4}$$

is less than a predetermined percentage. If yes, the SP4=SP4 and the corresponding signal is sent to the DCS. If no, then the change of methanol dilution water set point (SP4) is limited to a percentage of the initial flow set point (SP40) and the signal is sent to the DCS. The signal is also looped to the start of the calculations.

The conventional operation for chlorine dioxide production rate is merely feed-forward control on methanol flow that may or may not meet the target production rate, since the methanol efficiency varies and is affected by generator conditions. This invention uses a strategy to make minor adjustments to the methanol flow as a function of actual production deviation from the target production rate. The methanol feed rate is allowed to fluctuate within a certain range driven by the offset of actual production and the target. The methanol flow change is made in steps to minimize the possible impact on the chlorine dioxide strength control.

Figure 11A:
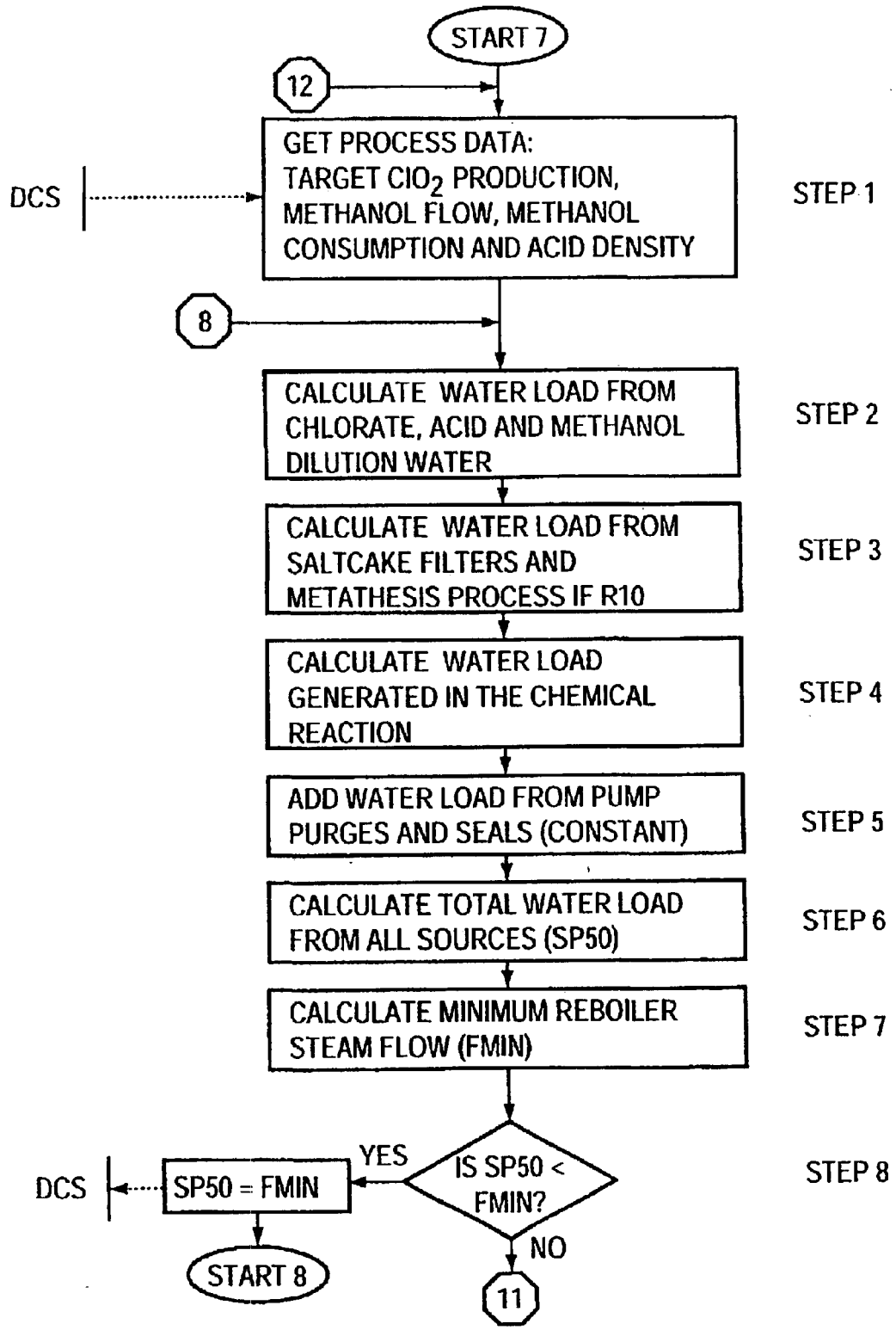
FIGS. 11A and 11B represent a flow chart showing the steps involved in the reboiler steam flow set point determination.
Figure 11B:
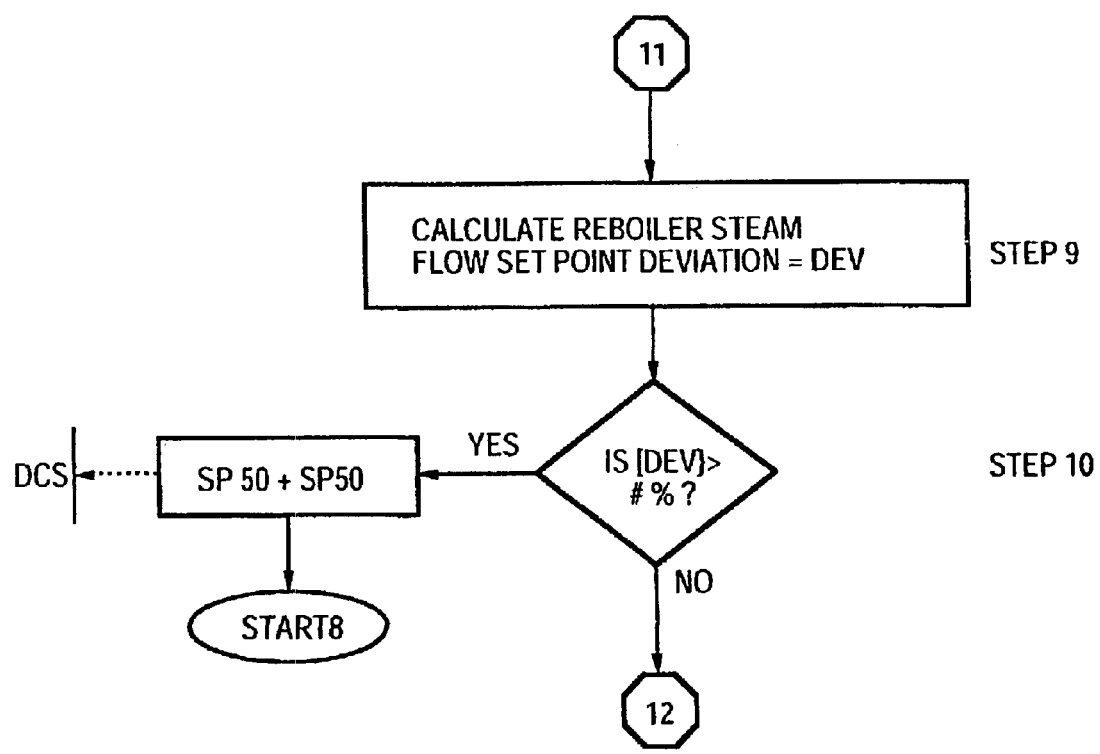

FIGS. 11A and 11B show the reboiler steam flow set point determination. Information relating to target chlorine dioxide production rate, methanol flow, methanol consumption and acid density is received from the DCS while the calculated sodium chlorate feed solution concentration is received from the calculations of FIG. 8A (signal 8). The water load from chlorate, acid and methanol dilution water is calculated, the water load from salt cake filter and acid sulfate metathesis process (if present) is calculated, the water load generated in the chemical reaction is calculated and information relating to the constant water load, pump purges and seals, is added. The total water load on the chlorine dioxide generator from all sources (SP50) is calculated along with the minimum reboiler steam flow required to evaporate the water load (FMIN). If SP50<FMIN, then SP50 is FMIN and the signal is sent to the DCS. If SP50 is not less than FMIN, then the reboiler steam flow set point deviation (DEV) is calculated. If DEV is greater than a predetermined percentage, then SP50 is the value of SP50 and the corresponding signal is sent to the DCS. In the event DEV is not greater than the predetermined percentage, then the signal loops back to the beginning of the calculations.

The conventional operation sets the steam flow in accordance to the target production rate regardless of the varying operating conditions. This invention monitors the ever-changing water input to the generator. The control strategy periodically quantifies all the water sources to maintain the mass balance of water load versus the evaporation rate at the reboiler and this determines the required steam flow rate.

Figure 12A:
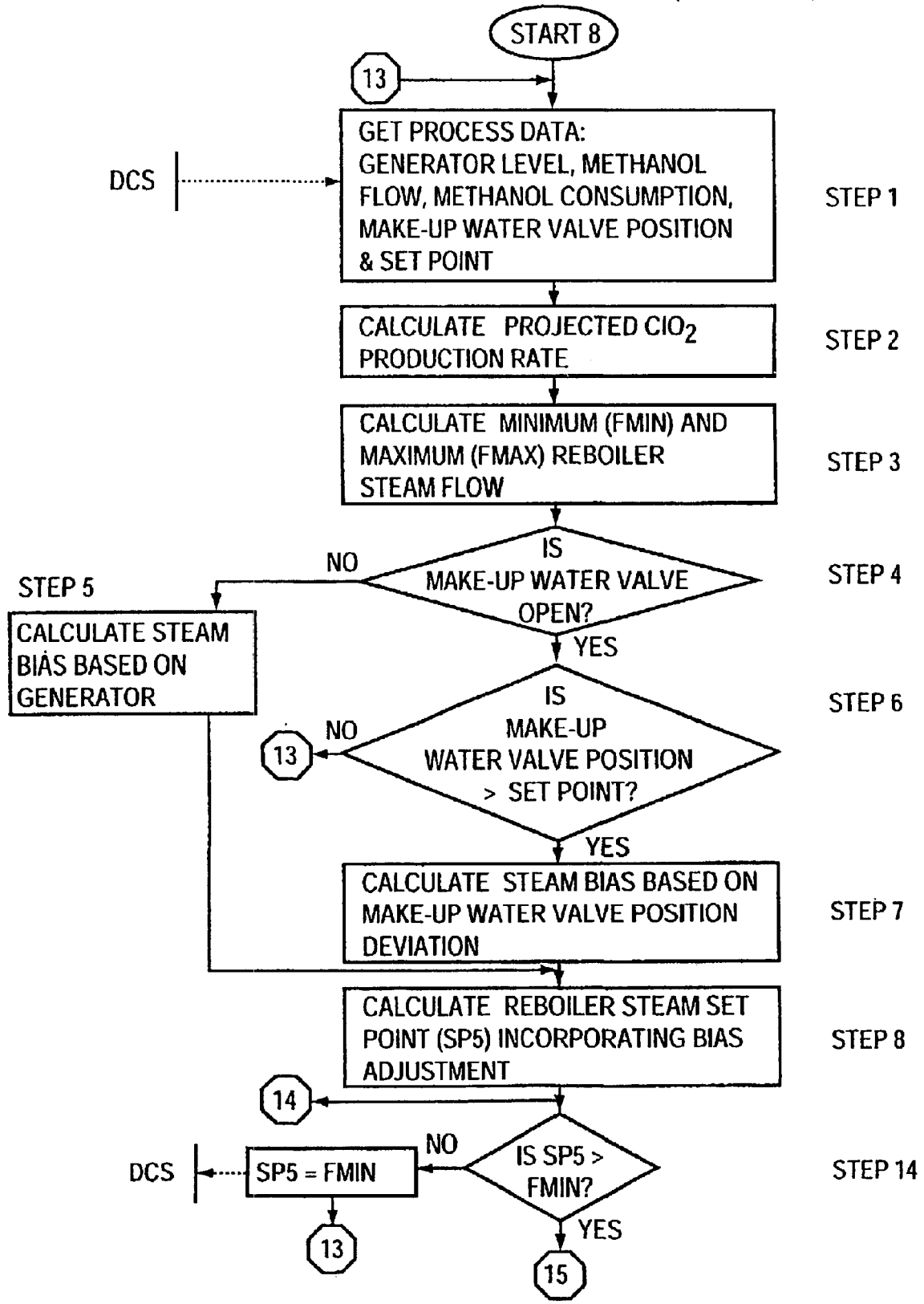
FIGS. 12A and 12B represent a flow chart showing the steps involved in chlorine dioxide generator liquor level control.
Figure 12B:
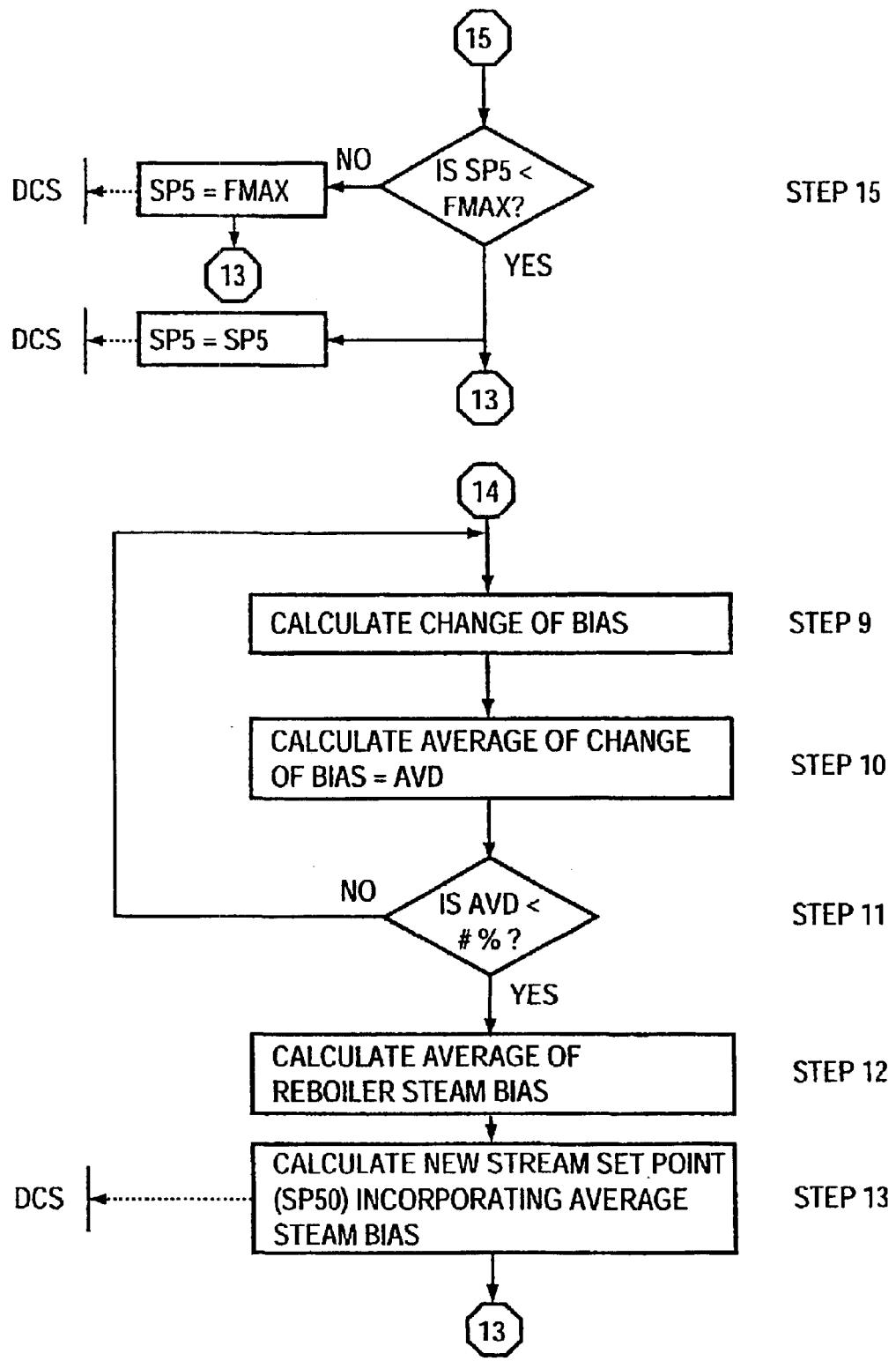

FIGS. 12A and 12B show the steps required for generator level control. Information relating to generator level, methanol flow and methanol consumption and make-up water valve position and its position set point is received from the DCS and the projected chlorine dioxide production rate is calculated. The minimum (FMIN) and maximum (FMAX) reboiler steam flows for that projected production rate are calculated. A determination then is made as to whether the make-up water valve is open. If no, then the steam bias required is calculated based on generator level deviation. If yes, a second determination is made as to whether the make-up water valve position is greater than its set point. If no, the signal loops back to the beginning of the calculations. If yes, then the steam bias required is calculated based on make-up water valve position deviation. The reboiler steam set point (SP5) then is calculated incorporating bias adjustment.

The change of bias (FIG. 12B) then is calculated and the average of the change of bias (AVD) is calculated. A determination is made if AVD is less than a predetermined percentage. If no, then the signal loops back to the commencement of the calculation. If yes, then the average of reboiler steam bias is calculated and the new steam set point (SP50) incorporating the average steam bias is calculated and forwarded to the DCS. The signal also is looped back to the beginning of the calculation.

The reboiler steam set point (SP5) is compared to minimum reboiler steam flow from the projected production rate (FMIN). If SP5 is not greater than FMIN, then SP5 is set to the value of FMIN and the signal forwarded to the DCS and looped back to the start of the calculation. If SP5 is greater than FMIN, then a further determination is made as to whether SP5<FMAX. If no, then SP5 is set to the value of FMAX and this value is forwarded to the DCS and looped back to the start of the calculation. If yes, then SP5 is set to the value of SP5 and this value is forwarded to the DCS and looped back to the start of the calculation.

Often the generator liquor level is not automatically controlled in conventional practice. In such case, the conventional operation involves setting a fixed steam flow according to the target production rate and hardcopy feed table described above and manually or automatically adjusting the make-up water to control the generator liquor level. Such an operation is deficient inasmuch as it requires unnecessarily high steam usage rates at all times in order to allow some continuous make-up water for control. In addition, the make-up water without any applied constraint may significantly increase the water load on the chlorine dioxide generator, resulting in more steam usage that further contributes to elevated generator liquor carryover. This invention uses a control strategy incorporating make-up water adjustment as a fine level control in conjunction with steam flow adjustment as a coarse level control. The concept is to keep the make-up water valve position always within a specified range. Step changes in reboiler steam flow are made according to the make-up water valve position or generator liquor level deviation as described above with respect to FIGS. 12A and 12B. Adjustment on both steam and make-up water flow not only assures a precise generator liquor level control but also minimizes the make-up water usage, resulting in steam savings.

There is a pre-set make-up water valve position beyond which steam is curtailed, thereby avoiding excessive steam usage owing to extra make-up water load. Proportional step changes in reboiler steam flow in comparison to the degree of generator level deviation prompts a fast correction on the deviated generator liquor level without overshoot.

The combined reboiler steam and make-up water flow control enables the generator liquor level to be maintained at its set point ±1%. Not only can the steady level be maintained but disturbances can be handled. For example, in the event the generator liquor level surges due to a water dump for some reason, the reboiler steam reacts immediately and the make-up water is fully shut off. Both actions rapidly decrease the generator liquor level, while the reboiler steam is gradually reduced as the generator liquor level moves towards its set point. The upset is remedied in a short time and swings of generator level are avoided.

As seen in FIG. 3, the overall strategy includes a chlorine dioxide solution strength internal loop. This invention basically adopts the conventional control strategy with an additional enhancement. The required chilled water flow to the absorption tower is calculated from the target chlorine dioxide strength, production rate and all existing water inputs to the tower. By accounting for all relevant operating conditions, aqueous chlorine dioxide solution strength fluctuations are minimized.

Figure 13A:
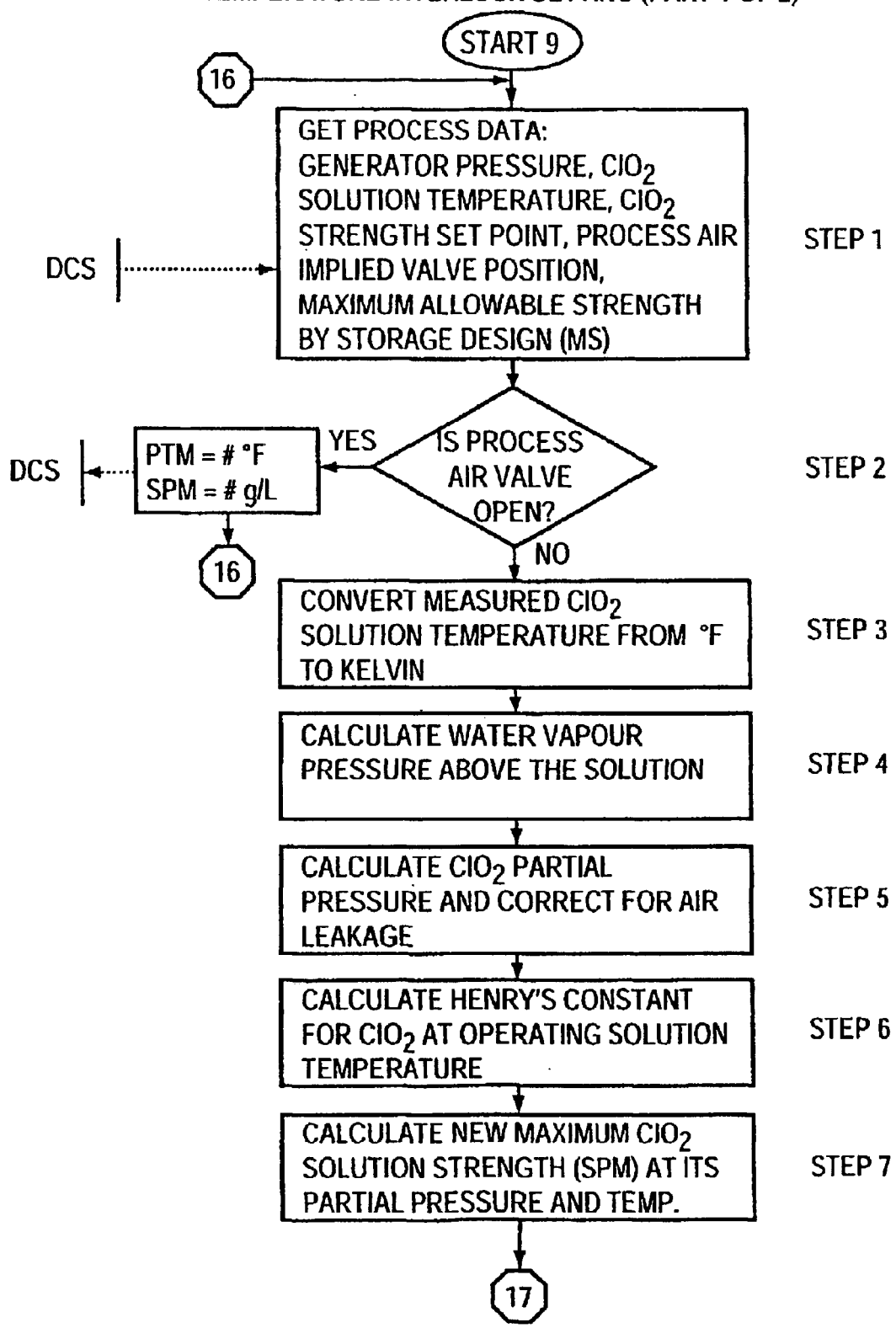
FIGS. 13A and 13B represent a flow chart showing the steps involved in interlock setting for maximum chlorine dioxide solution strength and temperature.
Figure 13B:
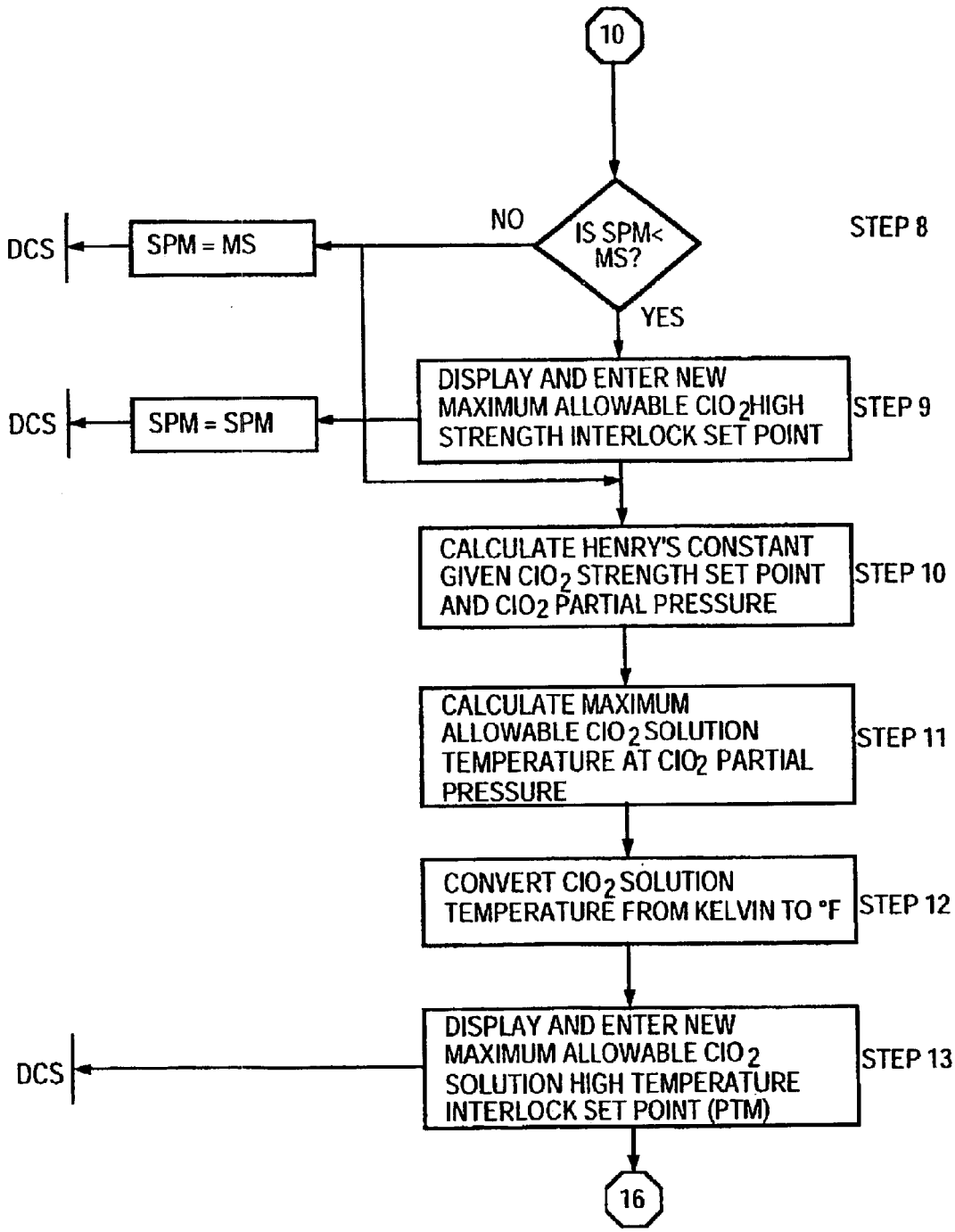

In addition to these various controls, a maximum chlorine dioxide strength and maximum temperature interlock set points are calculated to enable the operator to produce chlorine dioxide solution of the highest possible strength while avoiding losses of chlorine dioxide from the product solution. The steps involved are shown in FIGS. 13A and 13B. Information relating to chlorine dioxide generator pressure, chlorine dioxide solution temperature, chlorine dioxide strength set point, process air implied valve position and maximum allowable chlorine dioxide solution strength by storage design (MS) is obtained from the DCS and it is then determined if the process air valve is open. In the event the valve is open, the maximum chlorine dioxide solution high temperature interlock set point (PTM) and the maximum chlorine dioxide solution strength set point (SPM) take their predetermined values. These values are forwarded to the DCS and looped to the start of the calculation.

If the process air valve is closed, the measured chlorine dioxide solution temperature is converted to Kelvins, the water vapour above the solution is calculated, the partial pressure of chlorine dioxide above the solution is calculated and corrected for air leakage, and Henry's constant is calculated for chlorine dioxide at the operating solution temperature. A new maximum chlorine dioxide solution strength (SPM) is calculated at its partial pressure and temperature.

A determination then is made whether SPM<MS. If no, then SPM is the value of MS and is forwarded to the DCS. If yes, then the new maximum allowable chlorine dioxide high strength interlock set point is calculated and entered. In this case, the value of SPM is SPM and this signal is sent to the DCS.

In addition, Henry's constant is calculated at the given chlorine dioxide solution strength set point and chlorine dioxide partial pressure, the maximum allowable chlorine dioxide solution temperature at the chlorine dioxide partial pressure is calculated, the chlorine dioxide solution temperature is converted from Kelvins and the new maximum allowable chlorine dioxide solution high temperature interlock set point (PTM) is displayed and entered into the DCS and looped back to the beginning of the calculation.

The conventional operation employs fixed interlock set points for maximum chlorine dioxide strength and solution temperature based on assumed constant operating conditions at the absorption tower base. Such an operation is deficient in that the assumed conditions could be different from the existing conditions so that either the product strength is limited to be unnecessarily low or chlorine dioxide escapes from the absorption tower should the solution strength be higher than the existing operating conditions would allow. Consequently, this may result in a safety hazard, economic loss and/or a negative environmental impact. This invention calculates the maximum allowable chlorine dioxide solution strength and temperature based on actual operating conditions which become the new interlock set points as the operating conditions change. The solution strength can thus be set to optimum with the safety assurance.

Maximum allowable chlorine dioxide solution strength, therefore, is determined mainly based on the solution temperature. The value provides the information to the operator so the product can be made to its highest possible strength without suffering from gas loss in the absorption step. The advantages of providing an ongoing determination of allowable chlorine dioxide solution strength include saving on chilled water and subsequent chemical saving in the bleach plant. As the solution temperature increases, the maximum allowable strength decreases, so the occurrence of unexpected chlorine dioxide gas slippage from absorption tower can be prevented.

The maximum allowable chlorine dioxide solution temperature, therefore, is determined based on the chlorine dioxide solution strength. Both maximum allowable strength and maximum allowable temperature of the product are assigned as interlock set points and they become floating subject to the process conditions. Such a manner of plant manipulation imparts the operator the best knowledge how to achieve the highest possible strength and best saving while assuring the process safety.

This invention enables chlorine dioxide plants worldwide to be effectively controlled from a remote control location applying state of the art, industry accepted data communication technology.

The control system provided herein is a supervisory control software product that may be layered on existing chlorine dioxide generating plant DCS or incorporated into a new chlorine dioxide generating plant installation. Remote set points generated by the computer program running the control system on a suitable microprocessor in the manner described above are transferred to the $ClO_2$ plant DCS controllers only when the plant operator permits the controllers to accept the remote set points. The operator may disable supervisory control by selecting the local control mode for any or all controllers.

Figure 14:
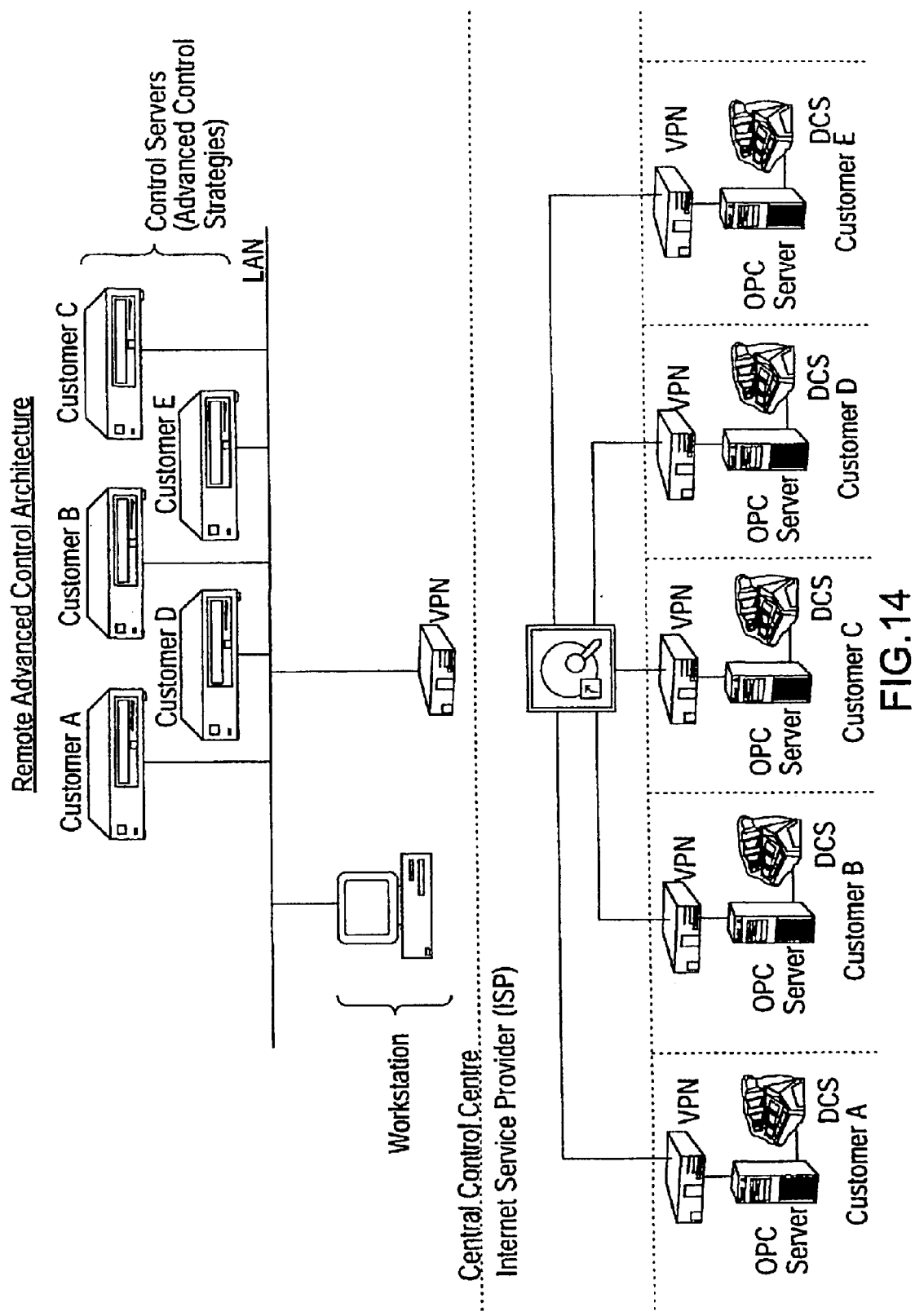
FIG. 14 is a schematic representation of the Remote Advanced Control Architecture.

The software may be customized and tuned for each customer and may be stored on a dedicated server at a remote location. Selected process data are extracted from the chlorine dioxide plant DCS at regular intervals using OPC (OLE for Process Control) server technology and transferred to the control location using VPN (virtual private network) communication technology. The controller set points, determined in the manner set forth in detail above, are transferred back to the $ClO_2$ plant DCS in the same way. A schematic of the architecture is shown in FIG. 14.

In this manner, chlorine dioxide generating plants worldwide can be controlled effectively from a remote location. Such a remote monitoring system makes professional maintenance always available to customers, thereby further improving operation reliability.

As described above and as seen from the drawings, the entire chlorine dioxide generating plant can be manipulated and controlled based on the target chlorine dioxide production rate and by using computer-aided calculations to maintain the target production rate, operation stability and optimum efficiency. Apart from initial testing to establish the plant specific chemical consumption, only occasional laboratory testing of generator liquor sodium chlorate concentration and solids content is required to ensure compliance with targets. The use of the control strategies described herein enables optimum use of feed chemicals, particularly of the most expensive chemical, sodium chlorate, to be employed for a given chlorine dioxide target production rate. This result has been demonstrated in an experimental commercial scale operation, where an overall savings of greater than 2% of chlorate feed was achieved for a target production rate of over 30 tons of chlorine dioxide per day.

It is also possible to employ a combination of the various advanced control strategies described herein with the conventional strategies, if desired, but these options are considered less desirable than using all the advanced control strategies.

In addition, the above specific description assumes that methanol is used as the reducing agent in the chlorine dioxide generating process. However, corresponding strategies may be used when other reducing agents, such as hydrogen peroxide, are employed, such as in R11® and SVP-HP® processes. Similar strategies may also be applicable to the non-SVP processes for chlorine dioxide generation, such as R2, Mathieson, Solvay, HP-A and others.

Other possible improvements involve linking the chlorine production rate to the overall bleach plant demand for chlorine dioxide, preferably in conjunction with maintaining a steady chlorine dioxide storage level. In such a case, a manual input of the target production rate is no longer required.

Another potential improvement would be the generator solids percent control based on controlling generator liquor density and saltcake filter operation parameters.

Yet another possible improvement could be the implementation of an on-line chlorate molarity analyser of the type described, for example in the U.S. Pat. No. 5,948,236, assigned to the assignee hereof.

EXAMPLE

This Example illustrates the application of the present invention to chlorine dioxide generation plant.

A commercial chlorine dioxide generating plant according to FIG. 1 was operated both conventionally and by utilizing the control system described herein and shown in FIGS. 2 to 13B.

In this plant scale study over a period of 12 months, the control system described herein in comparison to conventional operation resulted in an increase in yield of chlorine dioxide based on chlorate of over 2% and a significantly-decreased requirement for lab testing.

In addition, reductions were achieved in the variability of certain chlorine dioxide generator process parameters, as set forth in the following Table:

TABLE

| Parameter | % Variability Reduction |
| --- | --- |
| Deviation from Chlorine Dioxide Production Target | 82% |
| Deviation from Chlorine Dioxide Strength Target | 37% |
| Chlorine Dioxide Solution Strength to Bleach Plant | 35% |
| Generator Level | 35% |
| Acid Normality in Generator Liquor | 8% |
| Chlorate Molarity in Generator Liquor | 18% |

SUMMARY OF DISCLOSURE

In summary of this disclosure, the present invention enables improved control of the operation of a chlorine dioxide generating process to be achieved based on a target chlorine dioxide production rate by employing a series of advanced control strategies which provide for optimum chemical usage. Modifications are possible within the scope of the invention.

What we claim is:

1. A continuous process for the generation of chlorine dioxide at a target production rate, which comprises:

reducing chlorate ions in an aqueous acid reaction medium in a reaction zone using a reducing agent selected from the group consisting of methanol and hydrogen peroxide and sulfuric acid at the boiling point of the reaction medium under a subatmospheric pressure, removing a gaseous admixture comprising water vapour and chlorine dioxide from the reaction medium, absorbing said gaseous admixture in chilled water in an absorption zone to provide a product aqueous solution of chlorine dioxide, removing a slurry of spent reaction medium and by-product crystalline sulfate from the reaction zone, separating the crystalline sulfate as a by-product from spent reaction medium, adding make-up quantities of chlorate ions, reducing agent and sulfuric acid to the spent reaction medium to form a make-up feed, evaporating water inputted to the process from all sources using steam fed to a reboiler, recycling the make-up feed to the reaction zone, and computer controlling said process on the basis of a desired target chlorine dioxide production rate as the sole input from an operator to a computer program effecting such computer control.

2. The process of claim 1 wherein said chlorate ions are provided by sodium chlorate.

3. The process of claim 2 wherein said computer controlling operation comprises:

continuously monitoring the target production rate of aqueous chlorine dioxide solution for changes therein, continuously monitoring the flow rates of sodium chlorate, reducing agent, sulfuric acid, reboiler steam and chilled water to the process, and modifying the initial set points of all said flows in accordance with the changed target production rate.

4. The process of claim 3 wherein said computer controlling operation comprises:

continuously monitoring the production rate of aqueous chlorine dioxide solution for deviations from the target production rate, and modifying the reducing agent flow rate to maintain the production rate at its target.

5. The process of claim 1 wherein the maximum allowable chlorine dioxide product solution strength and maximum allowable temperature are advised.

6. The process of claim 4 including:

continuously monitoring the specification of all material feeds, and modifying the appropriate flow rate set points of said feeds to the reaction zone based on the target production rate and in response to changes in material specification.

7. The process of claim 4 including:

continuously monitoring sodium chlorate solution physical properties, temperature and density, and, on this basis, creating an on-line virtual chlorate solution analyzer that determines the volumetric concentration of the sodium chlorate solution.

8. The process of claim 7 wherein said on-line virtual chlorate solution analyzer provides an accuracy of about ±0.3% in the sodium chlorate concentration range of about 450 to about 750 gpL.

9. The process of claim 4 including:

continuously monitoring the mass input of sodium chlorate to the reaction medium, continuously monitoring the mass consumption of sodium chlorate by the process, and modifying the flow of sodium chlorate to the reaction medium to correspond to the mass consumption of sodium chlorate so as to maintain the sodium chlorate concentration in the reaction medium substantially constant.

10. The process of claim 4 including:

establishing the boiling temperature set point of the reaction medium based on the expected reaction medium composition, continuously monitoring the temperature of the aqueous acid reaction medium, continuously controlling the temperature of the reaction medium in order to maintain a constant acid normality in the reaction medium, and continuously predicting the acid normality of the aqueous acid reaction medium from the temperature and the chlorate molarity of the aqueous solution.

11. The process of claim 10, including:
continuously determining whether the temperature of the aqueous reaction medium differs from the temperature set point, and
correcting such deviation by suitable modification to the acid flow rate to the aqueous reaction medium.

12. The process of claim 4 including:
continuously controlling sodium chlorate molarity in the aqueous reaction medium on the basis of continuously determined system mass balance and adaptive yield tracking.

13. The process of claim 4 including:
periodically laboratory testing the concentration of sodium chlorate in the reaction medium and monitoring the results of such laboratory testing for a trend in alteration of the concentration of the sodium chlorate in the reaction medium,
determining whether or not the concentration of sodium chlorate in the reaction medium has changed in the same direction in a predetermined number of said periodic laboratory tests,
in the event, such a change has taken place and provided that the operator has selected the "ADAPTIVE YIELD" function switch, initiating a yield calculation using a series of laboratory tests to determine the applicable adaptive yield.

14. The process of claim 4 including:
periodically laboratory testing the concentration of sodium chlorate in the reaction medium,
determining whether or not the concentration of sodium chlorate in the reaction medium has changed from a target value, and
in the event such a change has taken place and provided the operator has selected the "LAB TEST" function switch, applying a one-time bias to the flow rate of sodium chlorate to the reaction medium for a predetermined time to adjust the sodium chlorate concentration in the reaction medium to the target value.

15. The process of claim 4 including:
maintaining the level of reaction medium in the reaction zone substantially constant by continuously balancing the volume of water flowing to the process and the volume of water evaporated from the reaction medium.

16. The process of claim 4 including continuously determining and displaying the acid normality of the reaction medium.

17. The process of claim 4 including continuously determining and displaying the concentration of sodium chlorate in the reaction medium.

18. The process of claim 2 wherein said reducing agent is methanol.

19. The process of claim 18 including:
continuously monitoring the production rate of aqueous chlorine dioxide solution, and
modifying the feed rate of methanol to the reaction medium in response to fluctuations within a predetermined range based on the initial methanol flow set point.

20. A continuous process for the generation of chlorine dioxide at a predetermined production rate, which comprises:
reducing sodium chlorate in an aqueous reaction medium in a reaction zone using methanol and sulfuric acid at the boiling point of the reaction medium under a subatmospheric pressure,
removing a gaseous admixture comprising water vapour and chlorine dioxide from the reaction medium,
absorbing said gaseous admixture in chilled water in absorption zone to provide a product aqueous solution of chlorine dioxide,
removing a slurry of spent reaction medium and by-product crystalline sodium sulfate from the reaction zone,
separating the crystalline sodium sulfate as a by-product from spent reaction medium,
adding make-up quantities of sodium chlorate, methanol and sulfuric acid to the spent reaction medium to form a make-up feed,
evaporating water inputted to the process from all sources using steam fed to a reboiler,
recycling the make-up feed to the reaction zone, and
computer controlling said process to produce chlorine dioxide from the reactants with optimum chemical usage on the basis of a desired chlorine dioxide production rate as the sole input to a computer program effecting such computer control.

21. The process of claim 20 wherein said computer program monitors parameters of the process, including:
aqueous chlorine dioxide solution production rate
pressure of the reaction zone
temperature, liquid level and sodium chlorate concentration of the reaction medium
flow rate of chilled water to the chlorine dioxide absorption step
flow rate of aqueous sodium chlorate solution, sulfuric acid and aqueous methanol to the reaction medium
flow rate of steam to the reboiler
flow rate of make-up water to the process
density and temperature of aqueous sodium chlorate feed
density of aqueous methanol feed said computer program further generating modification to flow controllers control of the flow rate of
chilled water to the chlorine dioxide absorption step
aqueous sodium chlorate, sulfuric acid and aqueous methanol to the reaction medium
steam to the reboiler.

22. The process of claim 21 wherein said computer program continuously monitors production rate of aqueous chlorine dioxide solution and compares the monitored production rate to the target production rate until a deviation resulting from fluctuations in the process is detected, whereupon the computer program initiates changes in the flow rate of methanol to restore the production rate to the target value.

23. The process of claim 22 wherein acid flow set point is determined by:
determining current sulfuric acid consumption, sulfuric acid concentration and target chlorine dioxide production rate
calculating the new acid flow set point.

24. The process of claim 22 or 23 wherein methanol dilution water set point is determined by:
determining current methanol consumption, methanol density and target chlorine dioxide production rate
calculating the new methanol flow set point
calculating the new methanol dilution water flow set point (SP40).

25. The process of claim 1 wherein chilled water to chlorine dioxide absorption step set point is determined by:
- determining current chlorine dioxide solution strength set point, reboiler steam flow, chilled water flow to chlorine dioxide storage tank vent scrubber and target chlorine dioxide production rate
- calculating the total required water flow at the target chlorine dioxide production rate
- calculating condensate flow from an indirect contact cooler for said gaseous admixture to the absorption tower
- calculating a new chilled water to absorption tower flow set point (SP70)
- calculating the minimum required chilled water flow to the absorption tower (SPMN)
- determining if SP70>SPMN
- if SP70 does not exceed SPMN, then the new chilled water flow set point (SP70) is SPMN
- if SP70 exceeds SPMN, then the new chilled water flow set point (SP70) is SP70.

26. The process of claim 25 including:
- determining if the chlorine dioxide strength or scrubber flow set points have changed
- if not, effecting chlorine dioxide solution strength control.

27. The process of claim 22 wherein aqueous sodium chlorate solution feed control to the reaction medium is determined by:
- determining current sodium chlorate solution flow, density and temperature, chlorine dioxide flow rate to storage and chlorine dioxide solution strength
- calculating average chlorine dioxide production rate
- calculating sodium chlorate usage based on actual chlorine dioxide production rate and yield
- calculating sodium chlorate concentration in sodium chlorate feed solution
- calculating required sodium chlorate solution flow rate
- determining current sodium chlorate molarity and percent solids target, reaction medium level and laboratory test data with respect to sodium chlorate molarity and percent solids in the reaction medium
- determining if the laboratory test data has changed
- in the event, that the laboratory test data has changed, determining whether an adaptive yield mode or lab test mode is selected
  - (A)—in the event the lab test mode is selected, calculating the reaction medium volume at the actual operating conditions,
- calculating the aqueous sodium chlorate mass inventory in the reaction medium at actual operating conditions,
- calculating reaction medium reference liquid volume at reference conditions
- calculating reference aqueous sodium chlorate mass inventory at reference conditions
- calculating the difference between said sodium chlorate mass inventories
- calculating an aqueous sodium chlorate solution flow adjustment bias and applying the bias to the calculated aqueous sodium chlorate flow rate for a predetermined time
- calculating the aqueous sodium chlorate solution flow set point incorporating the bias for the predetermined time
  - (B)—in the event the adaptive yield mode is selected and in the event, the number of laboratory tests criterion has been met, calculating the chlorine dioxide mass output beginning from the first valid laboratory test of said number of laboratory tests
- calculating the total sodium chlorate mass input beginning from the first valid laboratory test,
- calculating a corrected sodium chlorate consumption using the last valid laboratory test of said number of laboratory tests in relation to the predicted sodium chlorate concentration in the reaction medium
- calculating the sodium chlorate adaptive yield correction factor
- calculating the aqueous sodium chlorate flow set point incorporating the adaptive yield correction factor.

28. The process of claim 22 wherein aqueous reaction medium acidity control is effected by:
- determining the current sulfuric acid flow, aqueous reaction medium temperature, reaction medium target acid normality and sodium chlorate molarity and reaction zone pressure
- calculating from the latter information, the new sulfuric acid flow set point (SP20) and said flow controller set point limits
- calculating the reaction medium temperature controller set point (T20)
- calculating the deviation of reaction medium temperature from set point
- in the event the deviation exceeds a predetermined value, monitoring the deviation and, at the time the reaction medium temperature approaches the set point, resetting the current acid flow set point to the previously calculated value (SP20).

29. The process of claim 22 wherein chlorine dioxide production rate feedback control is effected by:
- determining the deviation (DEV) of chlorine dioxide production rate from the target
- in the event the deviation exceeds a predetermined value, calculating an adjusted methanol dilution water set point (SP4) from the deviation (DEV) and the initial methanol dilution set point (SP40)
- determining if $$\frac{SP4 - SP40}{SP4}$$

is less than a predetermined value, in which case the adjusted methanol dilution water set point (SP4) is employed, if not, limiting the methanol dilution water set point (SP4) increase to a predetermined percentage of the initial methanol dilution water flow set point (SP40).

30. The process of claim 22 wherein reboiler steam flow set point determination is effected by:
- determining the target chlorine dioxide production, methanol flow rate, methanol consumption and sulfuric acid density
- calculating the water load from sodium chlorate, sulfuric acid and methanol dilution water
- calculating water load from a salt cake filter used to effect separation of crystalline sodium sulfate from spent reaction medium
- calculating the water load generated in the chemical reaction
- adding water load from pump purges and seals
- calculating the reboiler steam flow set point for the total water load from all sources (SP50)

calculating the minimum reboiler steam flow (FMIN)

determining if SP50<FMIN, in which case SP50=FMIN in the event SP50 is not less than FMIN, calculating the reboiler steam flow set point deviation and if the deviation exceeds a predetermined value, the SP50= SP50.

31. The process of claim 22 wherein the reaction medium liquid level control is effected by:

determining the current reaction medium liquid level, methanol flow rate, methanol consumption, make-up water valve position and position set point calculating the projected chlorine dioxide production rate calculating the minimum (FMIN) and maximum (FMAX) reboiler steam flows determining whether the make-up water valve is open in the event the valve is closed, calculating a steam bias based on reaction medium liquid level deviation in the event the valve is open, determining if the make-up water valve position is greater than the predetermined make-up water valve position set point and, if so, calculating a steam bias based on make-up water valve position deviation calculating the reboiler steam set point incorporating the bias adjustment (SP5)

calculating change in bias calculating average of change of bias (AVD)

determining if AVD is less than a predetermined value and, if so, calculating the average of reboiler steam flow bias calculating the new steam set point (SP50) incorporating the average steam flow bias determining if SP5>FMIN and, if not, then SP5=FMIN if SP5>FMIN, determining if SP5<FMAX, if so, then SP5=SP5 and, if not, SP5=FMAX.

32. The process of claim 22, wherein the maximum allowable chlorine dioxide solution strength and temperature interlock is determined by:

determining the current reaction zone pressure, chlorine dioxide solution temperature, chlorine dioxide solution strength set point, process air implied valve position and maximum allowable chlorine dioxide solution strength by storage design (MS)

determining if the process air valve is open and if so, then the maximum chlorine dioxide solution strength and temperature interlock set points take their predetermined values in the event the process air valve is close, converting the chlorine dioxide solution temperature to Kelvins calculating the water vapour pressure above the chlorine dioxide solution calculating the chlorine dioxide partial pressure above the solution and correcting for air leakage calculating Henry's constant for chlorine dioxide at the operating solution temperature calculating the new maximum chlorine dioxide solution strength (SPM) at its partial pressure and temperature determining if SPM<MS and if not SPM=MS and if so, displaying and entering the new maximum allowable chlorine dioxide solution strength interlock set point and SPM=SPM calculating Henry's constant for the chlorine dioxide solution from its strength set point and chlorine dioxide partial pressure converting the chlorine dioxide solution temperature from Kelvins displaying and entering the maximum allowable solution temperature interlock set point (PTM).

* * * * *